(12) United States Patent
Chakrabarty et al.

(10) Patent No.: US 12,516,840 B2
(45) Date of Patent: Jan. 6, 2026

(54) SYSTEM AND METHOD FOR CONTROLLING A VAPOR COMPRESSION SYSTEM WITH SAFE ACTUATOR CHANGES

(71) Applicant: Mitsubishi Electric Research Laboratories, Inc., Cambridge, MA (US)

(72) Inventors: Ankush Chakrabarty, Bedford, MA (US); Christopher Laughman, Waltham, MA (US); Joel Paulson, Columbus, OH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 495 days.

(21) Appl. No.: 18/057,396

(22) Filed: Nov. 21, 2022

(65) Prior Publication Data
US 2024/0175591 A1    May 30, 2024

(51) Int. Cl.
*F24F 11/47*    (2018.01)
*F24F 11/64*    (2018.01)
(Continued)

(52) U.S. Cl.
CPC ............. *F24F 11/47* (2018.01); *F24F 11/64* (2018.01); *F25B 49/02* (2013.01); *G05B 19/042* (2013.01);
(Continued)

(58) Field of Classification Search
CPC ....... F24F 11/47; F24F 11/64; F25B 2500/05; F25B 49/02; G05B 19/042; G05B 2219/2614
See application file for complete search history.

(56) References Cited

U.S. PATENT DOCUMENTS

2015/0316282 A1\* 11/2015 Stone ................... G05B 13/048
                                                                  700/276
2020/0033039 A1\* 1/2020 Krishnamoorthy ..... F25B 41/20

OTHER PUBLICATIONS

Chakrabarty et al, Accelerating self-optimization control of refrigerant cycles with Bayesian optimization and adaptive moment estimation, Jul. 23, 2021, Applied Thermal Engineering, 197 (2021) (Year: 2021).\*

(Continued)

*Primary Examiner* — Tameem D Siddiquee
(74) *Attorney, Agent, or Firm* — Gene Vinokur

(57) ABSTRACT

The present disclosure provides a system and a method for controlling a vapor compression system (VCS). The method comprises collecting data points indicative of control of the operation of the VCS with different combinations of setpoints for different actuators of the VCS and corresponding costs of operation of the VCS for each of the different combinations of setpoints, and computing, using a Local Search Region Bayesian optimization (LSR-BO) of the combinations of setpoints and their corresponding costs of operation, a probabilistic surrogate model. The probabilistic surrogate model defines at least first two order moments of the cost of operation. The method further comprises selecting from the probabilistic surrogate model a current combination of setpoints improving the cost of operation with respect to a previous combination of setpoints, according to an acquisition function of the first two order moments of the cost of operation subject to a LRS constraint.

20 Claims, 14 Drawing Sheets

(51) Int. Cl.
*F25B 49/02* (2006.01)
*G05B 19/042* (2006.01)

(52) U.S. Cl.
CPC .. *F25B 2500/05* (2013.01); *G05B 2219/2614* (2013.01)

(56) References Cited

OTHER PUBLICATIONS

Eriksson et al, Scalable Global Optimization via Local Bayesian Optimization, 2019, NeurIPS (Year: 2019).*

* cited by examiner

SYSTEM AND METHOD FOR CONTROLLING A VAPOR COMPRESSION SYSTEM WITH SAFE ACTUATOR CHANGES

TECHNICAL FIELD

The present disclosure relates generally to a vapor compression system and more particularly to an apparatus and a method for controlling an operation of the vapor compression system with safe actuator changes.

BACKGROUND

Vapor compression systems, such as heat pumps, refrigeration, and air-conditioning systems, are widely used in industrial and residential applications. Introduction of variable speed compressors, variable position valves, and variable speed fans for a vapor compression cycle has greatly improved the flexibility of operation of the vapor compression system. Efficiency of the vapor compression systems can be improved by controlling the variable components of the vapor compression system. In other words, setpoints can be provided to the vapor compression system to improve the efficiency. For example, a speed of the compressor can be adjusted to modulate a flow rate of a refrigerant. A speed of an evaporator fan and a condenser fan can be varied to alter heat transfer between air and heat exchangers. A change in an expansion valve opening can influence a pressure drop between a high-pressure and a low-pressure in the vapor compression system, which, in turn, affects the flow rate of the refrigerant as well as super heat temperature at a corresponding evaporator outlet. A combination of the setpoints to the vapor compression system that delivers a particular amount of heat is often not unique and various combinations of the setpoints consume different amounts of energy. Therefore, it is desirable to operate the vapor compression system using a combination of setpoints that optimizes performance of the vapor compression system.

The performance of the vapor compression system can be further optimized after deployment by adapting control parameters (e.g., setpoints, controller gains, or internal model parameters) given a performance metric defined in terms of measured operational data. Manually tuning the control parameters can be highly inefficient and/or requires considerable task-specific expertise that cannot be generalized to all the vapor compression systems. To that end, some approaches use auto-tuning algorithms that automatically adjust the control parameters to achieve optimal performance. However, since a map between the control parameters and the performance metric is often unmodeled (unknown) and may be highly nonlinear, the map between the control parameters and the performance metric is contemplated as a black-box function with unknown structure. Therefore, the auto-tuning of the control parameters is considered as a black-box optimization problem. Such a black-box optimization problem can be solved by using a derivative-free optimization (DFO) method.

For example, Bayesian optimization (BO) method may be used for solving the black-box optimization problem. The BO method is a sample-efficient DFO method that uses a machine learning model to search over an admissible search space of the control parameters. However, online deployment of the BO method is challenging as the BO method ignores an impact of current control parameters values on future control parameters values. For example, the BO method tends to suggest control parameter values at consecutive iterations that are far apart in the admissible search space. Such large changes in the control parameter values can induce aggressive dynamic behavior of the vapor compression system which can lead to fail-safe mechanisms being triggered, or undesired transient dynamics that violate operational constraints of the vapor compression system.

Therefore, there is a need for a system and a method for performance optimization of the vapor compression system with safe operation of the vapor compression system.

SUMMARY

It is an object of some embodiments to provide a system a method for performance optimization of a Vapor Compression System (VCS) with safe actuator changes in the VCS. The VCS, such as heat pumps, refrigeration, and air-conditioning systems, are widely used in industrial and residential applications. Introduction of variable speed compressors, variable position valves, and variable speed fans for a vapor compression cycle has improved the flexibility of the operation of the VCS, e.g., the VCS can be operated with different combinations of setpoints. It is an objective of some embodiments to provide a data-driven approach for determining an optimal combination of setpoints minimizing power consumption of the VCS, without using an analytical model of underlying system dynamics. Such an objective can be realized by a probabilistic surrogate model. It is also an object of some embodiments to incrementally reach a global minimum of the probabilistic surrogate model with safe actuator changes to optimize performance of the VCS.

According to an embodiment, the probabilistic surrogate model provides a mapping between various combinations of setpoints for different actuators of the VCS and a probability distribution on the corresponding costs of operation. The different actuators of the VCS may include one or more actuators controlling a position of an expansion valve of the VCS, an indoor fan of the VCS, an outdoor fan of the VCS, damper actuators, and the like. The setpoints may include values of an electrical expansion valve (EEV) position, an indoor fan speed (IFS), an outdoor fan speed (OFS), and the like. According to an embodiment, the cost of operation corresponding to the combination of setpoints is the power consumption of the VCS operated according to the combination of setpoints.

The probabilistic surrogate model can be constructed using a probabilistic machine learning algorithm (such as Gaussian process regression) that maps combinations of the setpoints and the probability distribution on the corresponding costs of operation, such that the probabilistic surrogate model defines at least the first two order moments of the cost of operation in the probabilistic mapping. In an embodiment, the at least first two order moments may include a mean of the cost of operation and a variance of the cost of operation (also referred to as confidence range). For example, for a given combination of setpoints, the probabilistic surrogate model provides not only a power consumption prediction but also a confidence range around the predicted power consumption (e.g., the power consumption prediction is 1000 W, and 95% confidence range that the predicted power consumption will be between 960 W and 0 W).

Further, some embodiments aim to select a combination of the setpoints (also referred to as 'data point') in a global search space of admissible setpoints, that has to be queried next. As used herein, querying the combination of setpoints (or the data point) refers to an evaluation of an objective with the combination of setpoints (for example, operating the VCS according to the combination of setpoints). Some embodiments use an acquisition function of the first two order moments of the cost of operation to select the data point to query next.

The acquisition function uses the probabilistic mapping provided by the probabilistic surrogate model to select the data point to query next. Therefore, the acquisition function is used as a guide to determine a data point to query next. In an embodiment, the acquisition function is maximized to select an optimal data point (i.e., an optimal combination of setpoints) having the largest likelihood of being a global minimum of the probabilistic surrogate model, for querying and optimizing the operation of the VCS. In some embodiments, such surrogate model construction and surrogate model exploitation are used for Bayesian optimization. In other words, the Bayesian optimization includes the probabilistic surrogate model using the Gaussian process regression for providing the probabilistic mapping, and the acquisition function that exploits the probabilistic mapping provided by the probabilistic surrogate model to direct the querying of consequent data points.

However, since Bayesian optimization balances the exploration of unevaluated data points and exploitation of the optimal data points, it tends to select data points at consecutive control steps that are far apart in the global search space. For example, the Bayesian optimization selects a current data point ($\theta_{k+1}$), which is far apart from a previous data point ($\theta_k$) in the global search space. Since the current data point is far apart from the previous data point, there exists a large difference between the current data point and the previous data point. Therefore, to implement such a current data point in closed-loop systems for querying, the different actuators of the VCS have to be operated aggressively, leading to aggressive dynamic behavior of the VCS that leads to violation of safety constraints or triggers fail-safe mechanisms that limit performance quality. For example, energy efficiency in the VCS depends on the position of the EEV. Aggressively opening and closing the EEV causes excessive wear and tear of mechanical components of the EEV and may produce oscillations in refrigerant flow dynamics that result in compromised heating/cooling performance of the VCS.

Some embodiments are based on the realization that such undesired behaviors of the VCS can be mitigated by restricting a distance between the current data point and the previous data point by enforcing Local Search Region (LSR) constraint on the acquisition function. In other words, a restriction is imposed on how much the setpoints can be changed at every control step by using the LSR constraint. The Bayesian optimization incorporated with the LSR constraint is referred to as a Local Search Region constrained Bayesian Optimization (LSR-BO).

according to some embodiments of the present disclosure. The LSR constraint defines the local search space region around the previous data point, such that any data point in the local search space region is a feasible data point. The feasible data refers to a data point to which the previous data point can be updated in the consecutive control step and implemented in the closed-loop systems without causing the VCS to behave in undesired manner.

In such a manner, the LSR-BO iteratively explores the global search space to select an optimal data point having the largest likelihood of being a global minimum at the probabilistic surrogate model. For example, if a likely global minimum of the probabilistic surrogate model is outside of the local search space region around the previous data point defined by the LSR constraint, the acquisition function, at each control step, incrementally selects the data points towards the likely global minimum while satisfying the LSR constraint. In such a manner, the likely global minimum can be reached within multiple control steps. Notably, doing in such a manner allows for an incremental search for the global minimum at the probabilistic surrogate model.

For example, in some embodiments, the LSR-BO optimizes the acquisition function over the local search space region around the previous data point to determine a local data point in the local search space region, that has the largest likelihood of yielding a better cost of operation than a cost of operation corresponding to the previous data point. Since the determined local data point lies within the local search space region around the previous data point, the local data point is a feasible data point. The determination of the local data point in the local search space region around the previous data point, as a current data point, is referred to as a local optimality objective.

However, some embodiments are based on the realization that merely enforcing the LSR constraint at each control step, may force the LSR-BO to stick in regions of the global search space that yield suboptimal objective values. For instance, it is possible that no nearby data point is likely to improve upon the previous data point. Such a case occurs whenever the largest acquisition function value in the local search space region is small, indicating the local search space region has been sufficiently well-explored and, thus, the local data point is not an optimal sample choice.

When such situations arise, the LSR-BO globally optimizes the acquisition function to determine the best possible global data point in the global search space in a direction towards a globally optimal data point, as the current data point. Since the global data point lies outside the local search space region of the previous data point, the global data point may not satisfy the LSR constraint and, thus, may not be a feasible point. To guarantee the satisfaction of the LSR constraint, the global data point is projected onto the local search space region of the previous data point, which implies as taking the largest possible feasible step in the direction of the globally optimal data point. The determination of the global data point projected onto the local search space region of the previous data point, as the current data point, is referred to as a global optimality objective.

To that end, the LSR-BO needs to balance between the local optimality objective (i.e., take a nearby safe step when there is a chance of improving upon the previous data point) and the global optimality objective (i.e., take multiple safe steps towards a new region of the global search space when the local space search is exhausted) to determine the current data point. Specifically, the acquisition function of the LSR-BO needs to switch between the local optimality objective and the global optimality objective to determine the current data point.

In some embodiments, the switching between the local optimality objective and the global optimality objective is achieved based on a user-defined threshold. For instance, if a value of the acquisition function is greater than the user-defined threshold, then the local optimality objective is executed to determine the local data point as the current data point for the current control step. If the value of the acquisition function is lesser than the user-defined threshold, then the global optimality objective is executed, and the global data point projected onto the local search space region of the previous data point is determined as the current data point for the current control step. In such a manner, the acquisition function switches between the local optimality objective and the global optimality objective. To that end, in some embodiments, the acquisition function is a switch function including the local optimality objective, the global optimality objective, and a criterion (i.e., user-defined threshold) for switching between the local optimality objective and the global optimality objective. This approach of switching is simple to implement, with less computational and memory requirements, and guarantees convergence to the globally optimal data point.

Further, the determined current data point (i.e., the local data point or the global data point projected onto the local search space region of the previous data point) is applied to a feedback controller associated with the VCS. The feedback controller is configured to determine control commands corresponding to setpoints in the determined data point. Further, the feedback controller controls the operation of the VCS based on the control commands to change the states of the actuators of the VCS according to the determined data point. Specifically, in an embodiment, the feedback controller measures an output of the VCS (or a process variable). The measured value is applied as feedback signal to the feedback controller. The feedback controller computes an error signal as a difference between the determined current data point and the feedback signal. The feedback controller uses control parameters such as a proportional gain, an integral term, and/or a derivative term. The control parameters may be applied to the error signal to determine an input for the VCS to drive the process variable or the VCS output according to the determined data point. The feedback controller is one or a combination of a Proportional Integral (PI) controller, a proportional-integral-derivative (PID) controller, a Model Predictive Control (MPC) controller, or a robust controller.

Further, the VCS yields a cost of operation (for example, the power consumption) corresponding to the current data point. Further, the current data point and the corresponding cost of operation are used to update the probabilistic surrogate model using the Bayesian optimization. Consequently, an updated probabilistic surrogate model is obtained. Further, in the next control step, the same acquisition function of the LSR-BO is applied to the updated probabilistic surrogate model to determine a new current data point for controlling the VCS.

Accordingly, one embodiment discloses a controller for controlling an operation of a vapor compression system (VCS). The controller comprises at least one processor; and memory having instructions stored thereon that, when executed by the at least one processor, cause the controller to: collect data points indicative of control of the operation of the VCS with different combinations of setpoints for different actuators of the VCS and corresponding costs of operation of the VCS for each of the different combinations of setpoints; compute, using a Local Search Region Bayesian optimization (LSR-BO) of the combinations of setpoints and their corresponding costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping; select from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model; submit the current combination of the setpoints to a feedback controller to control the actuators of the VCS at a current control step according to their corresponding setpoints in the current combination of setpoints to collect a current cost of operation; and update the collected data points with the current combination of setpoints and the corresponding current cost of operation.

Another embodiment discloses a method for controlling an operation of a vapor compression system (VCS). The method comprises collecting data points indicative of control of the operation of the VCS with different combinations of setpoints for different actuators of the VCS and corresponding costs of operation of the VCS for each of the different combinations of setpoints; computing, using a Local Search Region Bayesian optimization (LSR-BO) of the combinations of setpoints and their corresponding costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping; selecting from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model; submitting the current combination of the setpoints to a feedback controller to control the actuators of the VCS at a current control step according to their corresponding setpoints in the current combination of setpoints to collect a current cost of operation; and updating the collected data points with the current combination of setpoints and the corresponding current cost of operation.

Yet another embodiment discloses a non-transitory computer readable storage medium embodied thereon a program executable by a processor for performing a method for controlling an operation of a vapor compression system (VCS). The method comprises collecting data points indicative of control of the operation of the VCS with different combinations of setpoints for different actuators of the VCS and corresponding costs of operation of the VCS for each of the different combinations of setpoints; computing, using a Local Search Region Bayesian optimization (LSR-BO) of the combinations of setpoints and their corresponding costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping; selecting from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model; submitting the current combination of the setpoints to a feedback controller to control the actuators of the VCS at a current control step according to their corresponding setpoints in the current combination of setpoints to collect a current cost of operation; and updating the collected data points with the current combination of setpoints and the corresponding current cost of operation.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. The term "based on" means at least partially based on. Further, it is to be understood that the phraseology and terminology employed herein are for the purpose of description and should not be regarded as limiting unless specifically defined as a limitation. Any heading utilized within this description is for convenience only and has no legal or limiting effect.

Figure 1A:
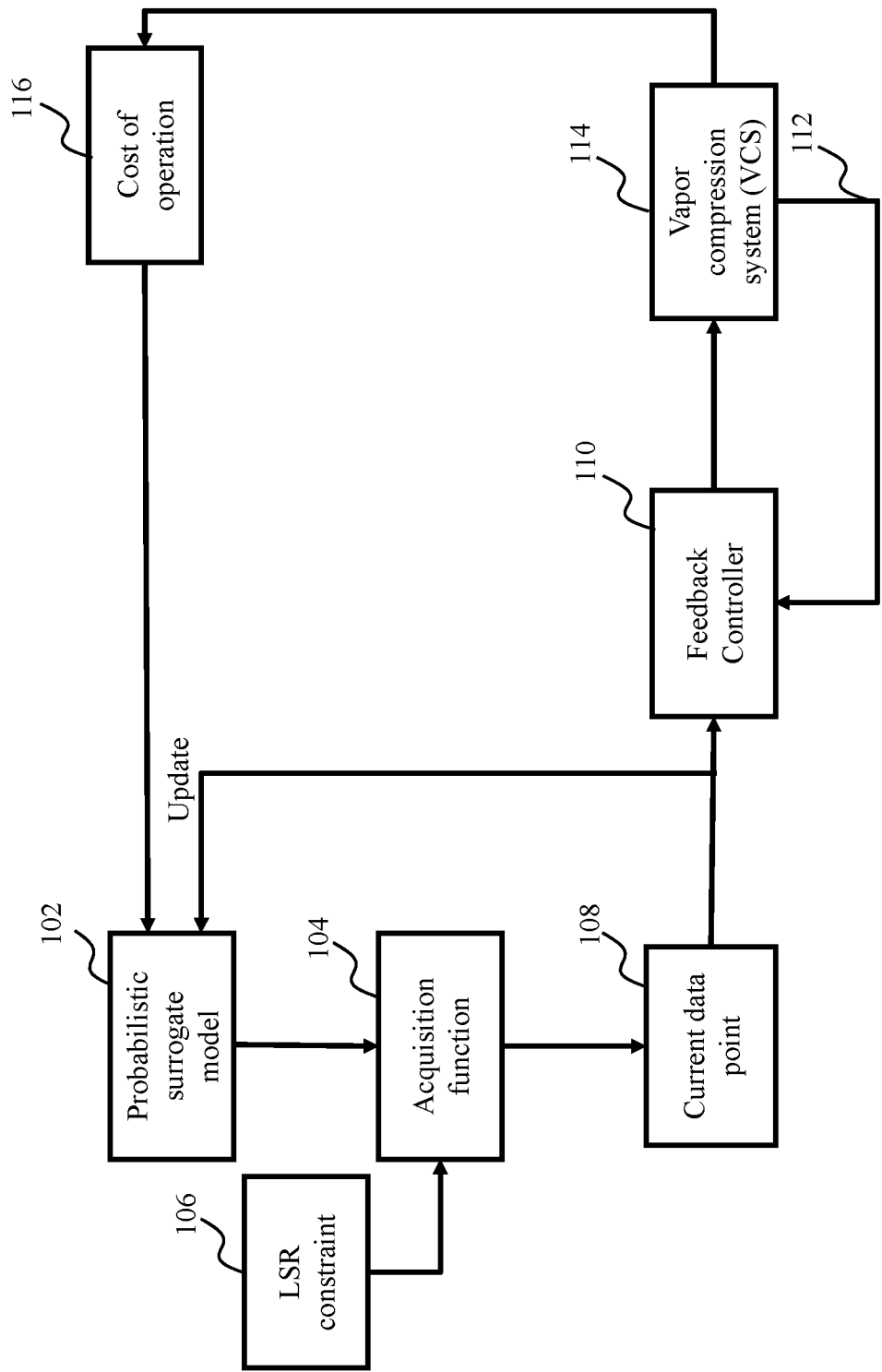
FIG. 1A illustrates a schematic for controlling an operation of a vapor compression system, according to an embodiment of the present disclosure.

FIG. 1A-FIG. 1E illustrate schematics of principles employed by some embodiments for controlling an operation of a vapor compression system. FIG. 1A-FIG. 1E are explained in conjunction with each other. FIG. 1A illustrates a schematic for controlling an operation of a Vapor Compression System (VCS) 114, according to an embodiment of the present disclosure. The VCS 114, such as heat pumps, refrigeration, and air-conditioning systems, are widely used in industrial and residential applications. Introduction of variable speed compressors, variable position valves, and variable speed fans for a vapor compression cycle has improved the flexibility of the operation of the VCS, e.g., the VCS 114 can be operated with different combinations of setpoints. It is an objective of some embodiments to provide a data-driven approach for determining an optimal combination of setpoints minimizing power consumption of the VCS 114, without using an analytical model of underlying system dynamics. Such an objective can be realized by a probabilistic surrogate model 102. It is also an object of some embodiments to incrementally reach a global minimum at the probabilistic surrogate model 102 with safe actuator changes to optimize performance of the VCS 114.

According to an embodiment, the probabilistic surrogate model 102 provides a mapping between various combinations of setpoints for different actuators of the VCS 114 and a probability distribution on the corresponding costs of operation. The different actuators of the VCS 114 may include one or more actuators controlling a position of an expansion valve of the VCS 114, an indoor fan of the VCS 114, an outdoor fan of the VCS 114, damper actuators, and the like. The setpoints may include values of an electrical expansion valve (EEV) position, an indoor fan speed (IFS), an outdoor fan speed (OFS), and the like. According to an embodiment, the cost of operation corresponding to the combination of setpoints is the power consumption of the VCS 114 operated according to the combination of setpoints.

The probabilistic surrogate model 102 can be constructed using a probabilistic machine learning algorithm (such as Gaussian process regression) that maps combinations of the setpoints and the probability distribution on the corresponding costs of operation, such that the probabilistic surrogate model defines at least the first two order moments of the cost of operation in the probabilistic mapping. In an embodiment, the at least first two order moments may include a mean of the cost of operation and a variance of the cost of operation (also referred to as confidence range). For example, for a given combination of setpoints, the probabilistic surrogate model 102 provides not only a power consumption prediction but also a confidence range around the predicted power consumption (e.g., the power consumption prediction is 1000 W, and 95% confidence range that the predicted power consumption will be between 960 W and 1040 W).

Figure 1B:
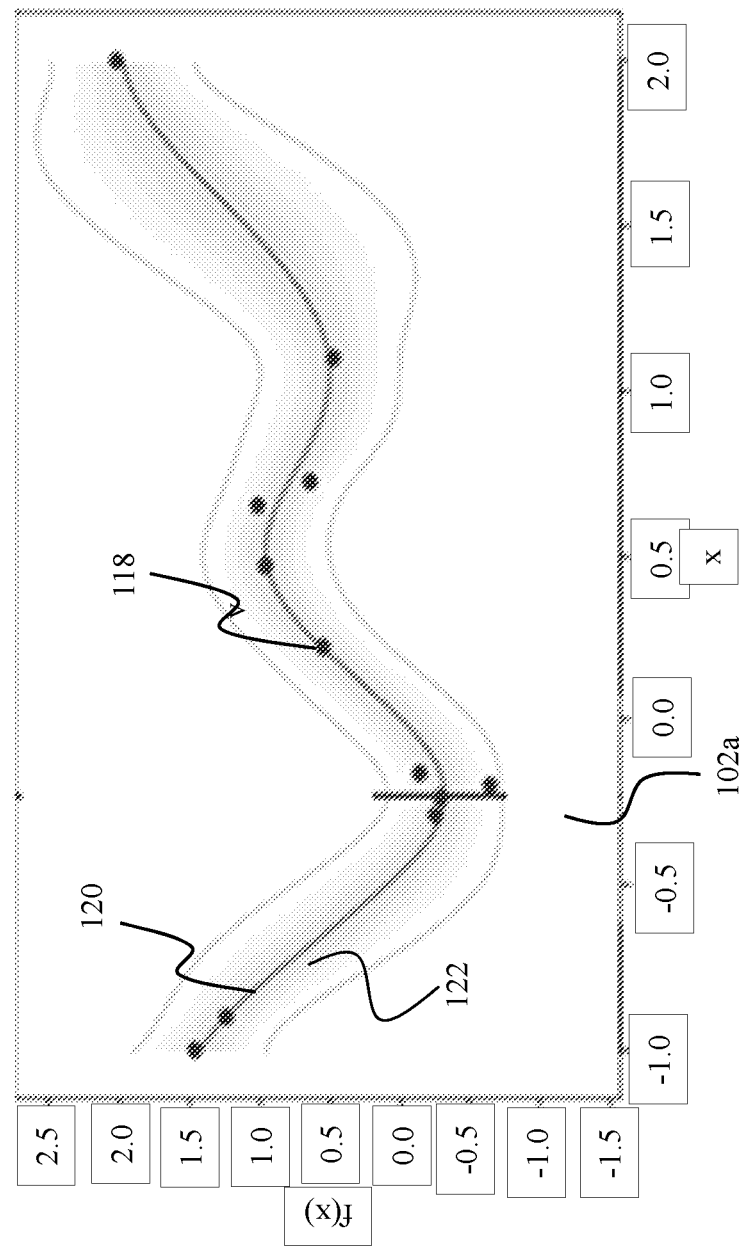
FIG. 1B illustrates a mean prediction and a confidence range provided by a probabilistic surrogate model, according to some embodiments of the present disclosure.

FIG. 1B illustrates a mean prediction and the confidence range provided by the probabilistic surrogate model 102, according to some embodiments of the present disclosure. Each dot 118 represents a data point indicative of a combination of setpoints. A curve 120 represents the mean prediction and shaded area 122 represents the confidence range.

Further, some embodiments aim to select a combination of the setpoints (also referred to as 'data point') in a global search space 102a of admissible setpoints, that has to be queried next. As used herein, querying the combination of setpoints (or the data point) refers to an evaluation of an objective with the combination of setpoints (for example, operating the VCS 114 according to the combination of setpoints). Some embodiments use an acquisition function 104 of the first two order moments of the cost of operation to select the data point to query next.

Figure 1C:
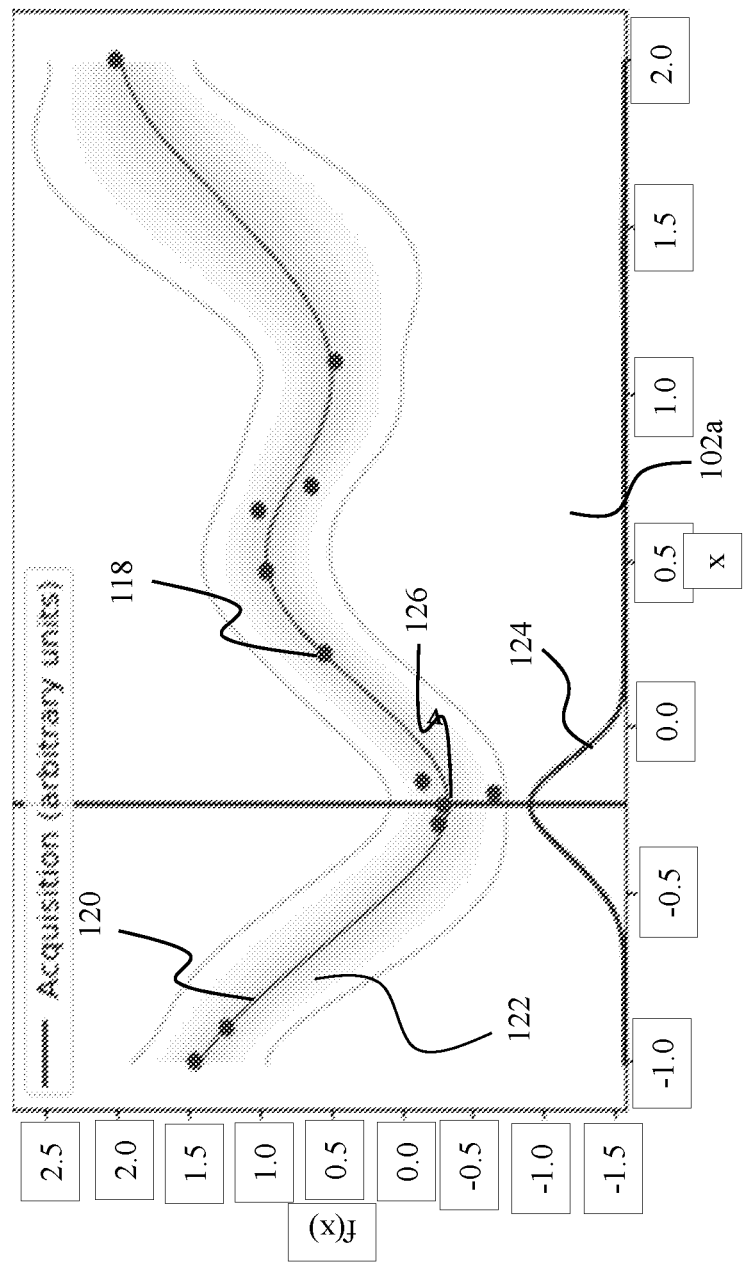
FIG. 1C illustrates a curve of an acquisition function, according to some embodiments of the present disclosure.

FIG. 1C shows a curve 124 of the acquisition function 104, according to some embodiments of the present disclosure. The acquisition function 104 uses the probabilistic mapping provided by the probabilistic surrogate model 102 to select the data point to query next. For example, if at a first data point (that has not been queried before, the probabilistic surrogate model 102 yields that the power consumption may be at least 900 W with 85% confidence range, and at a second data point (that has also not been queried before), the probabilistic surrogate model 102 yields that the power consumption may be at least 990 W with 95% confidence range, then the first data point needs to be queried before querying the second data point even though the first data point has low confidence range because 900 W is more likely optimal power consumption of the VCS 114. Therefore, the acquisition function 104 is used as a guide to determine a data point to query next.

In an embodiment, the acquisition function 104 is maximized to select an optimal data point (i.e., an optimal combination of setpoints) having the largest likelihood of being a global minimum 126 of the probabilistic surrogate model 102, for querying and optimizing the operation of the VCS 114. In some embodiments, such surrogate model construction and surrogate model exploitation are used for Bayesian optimization. In other words, the Bayesian optimization includes the probabilistic surrogate model 102 using the Gaussian process regression for providing the probabilistic mapping, and the acquisition function 104 that exploits the probabilistic mapping provided by the probabilistic surrogate model 102 to direct the querying of consequent data points.

However, since Bayesian optimization balances the exploration of unevaluated data points and exploitation of the optimal data points, it tends to select data points at consecutive control steps that are far apart in the global search space 102a. For example, the Bayesian optimization selects a current data point ($\theta_{k+1}$), which is far apart from a previous data point ($\theta_k$) in the global search space. Since the current data point is far apart from the previous data point, there exists a large difference between the current data point and the previous data point. Therefore, to implement such a current data point in closed-loop systems for querying, the different actuators of the VCS 114 have to be operated aggressively, leading to aggressive dynamic behavior of the VCS 114 that leads to violation of safety constraints or triggers fail-safe mechanisms that limit performance quality. For example, energy efficiency in the VCS 114 depends on the position of the EEV. Aggressively opening and closing the EEV causes excessive wear and tear of mechanical components of the EEV and may produce oscillations in refrigerant flow dynamics that result in compromised heating/cooling performance of the VCS 114.

Some embodiments are based on the realization that such undesired behaviors of the VCS 114 can be mitigated by restricting a distance between the current data point and the previous data point by enforcing Local Search Region (LSR) constraint 106 on the acquisition function 104. In other words, a restriction is imposed on how much the setpoints can be changed at every control step by using the LSR constraint 106. The Bayesian optimization incorporated with the LSR constraint 106 is referred to as a Local Search Region constrained Bayesian Optimization (LSR-BO). The LSR constraint 106 defines a local search space region around the previous data point, as described below in FIG. 1D.

Figure 1D:
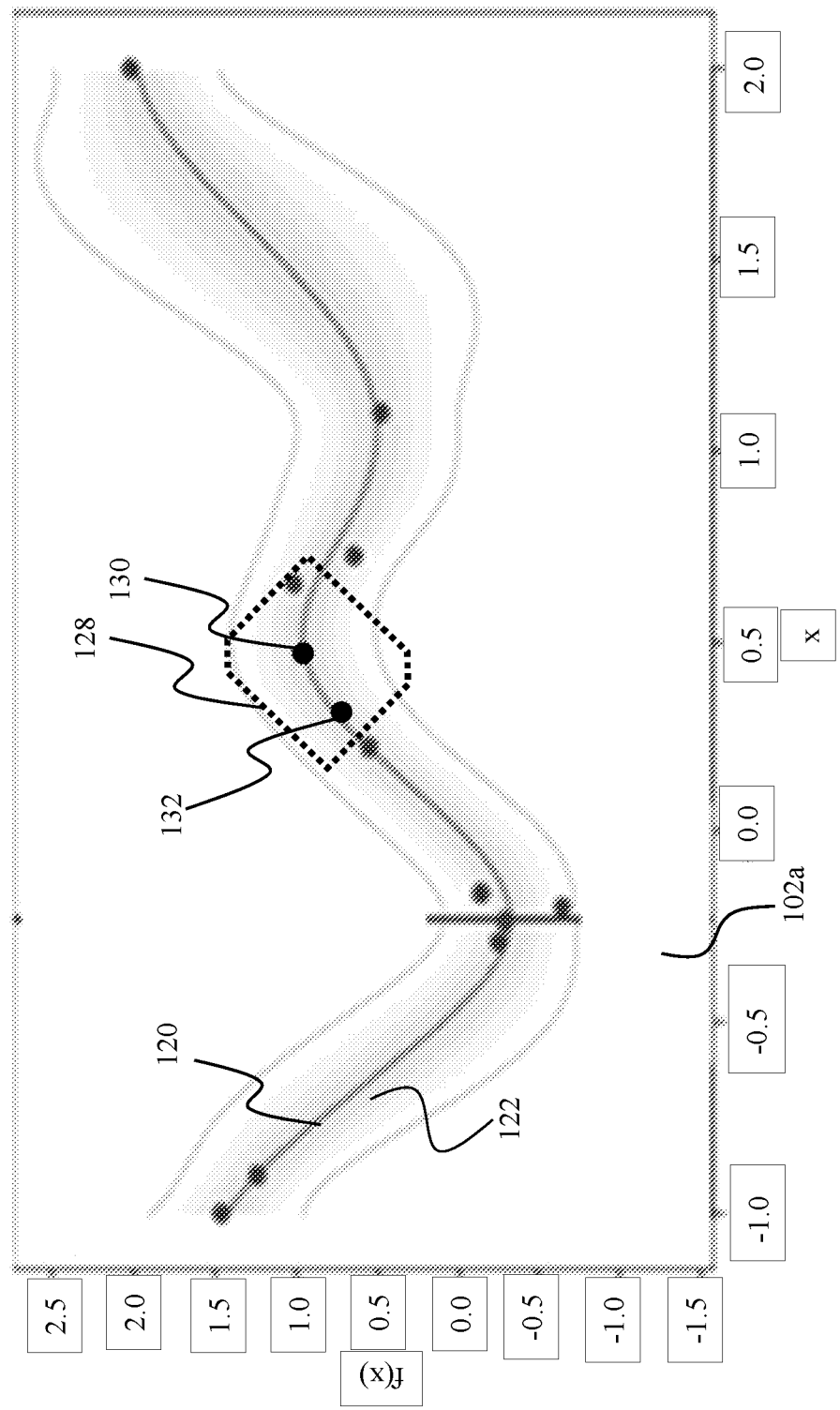
FIG. 1D illustrates a local search space region around a previous data point defined by a Local Search Region (LSR) constraint, according to some embodiments of the present disclosure.

FIG. 1D illustrates a local search space region 128 around a previous data point 130 defined by the LSR constraint 106, according to some embodiments of the present disclosure. The LSR constraint 106 defines the local search space region 128 around the previous data point 130, such that any data point in the local search space region 128 is a feasible data point. The feasible data refers to a data point to which the previous data point can be updated in the consecutive control step and implemented in the closed-loop systems without causing the VCS 114 to behave in undesired manner.

In such a manner, the LSR-BO iteratively explores the global search space 102a to select an optimal data point having the largest likelihood of being a global minimum 126 at the probabilistic surrogate model 102. For example, if a likely global minimum of the probabilistic surrogate model 102 is outside of the local search space region 128 around the previous data point 130 defined by the LSR constraint 106, the acquisition function 104, at each control step, incrementally selects the data points towards the likely global minimum while satisfying the LSR constraint 106. In such a manner, the likely global minimum can be reached within multiple control steps. Notably, doing in such a manner allows for an incremental search for the global minimum 126 at the probabilistic surrogate model 102.

For example, in some embodiments, the LSR-BO optimizes the acquisition function 104 over the local search space region 128 around the previous data point 130 to determine a local data point 132 (also referred to as 'a local combination of setpoints') in the local search space region 128, that has the largest likelihood of yielding a better cost of operation than a cost of operation corresponding to the previous data point 130. Since the determined local data point 132 lies within the local search space region 128 around the previous data point 130, the local data point 132 is a feasible data point. The determination of the local data point 132 in the local search space region 128 around the previous data point 130, as a current data point 108, is referred to as a local optimality objective.

However, some embodiments are based on the realization that merely enforcing the LSR constraint 106 at each control step, may force the LSR-BO to stick in regions of the global search space 102a that yield suboptimal objective values. For instance, it is possible that no nearby data point is likely to improve upon the previous data point. Such a case occurs whenever the largest acquisition function value in the local search space region is small, indicating the local search space region has been sufficiently well-explored and, thus, the local data point is not an optimal sample choice.

Figure 1E:
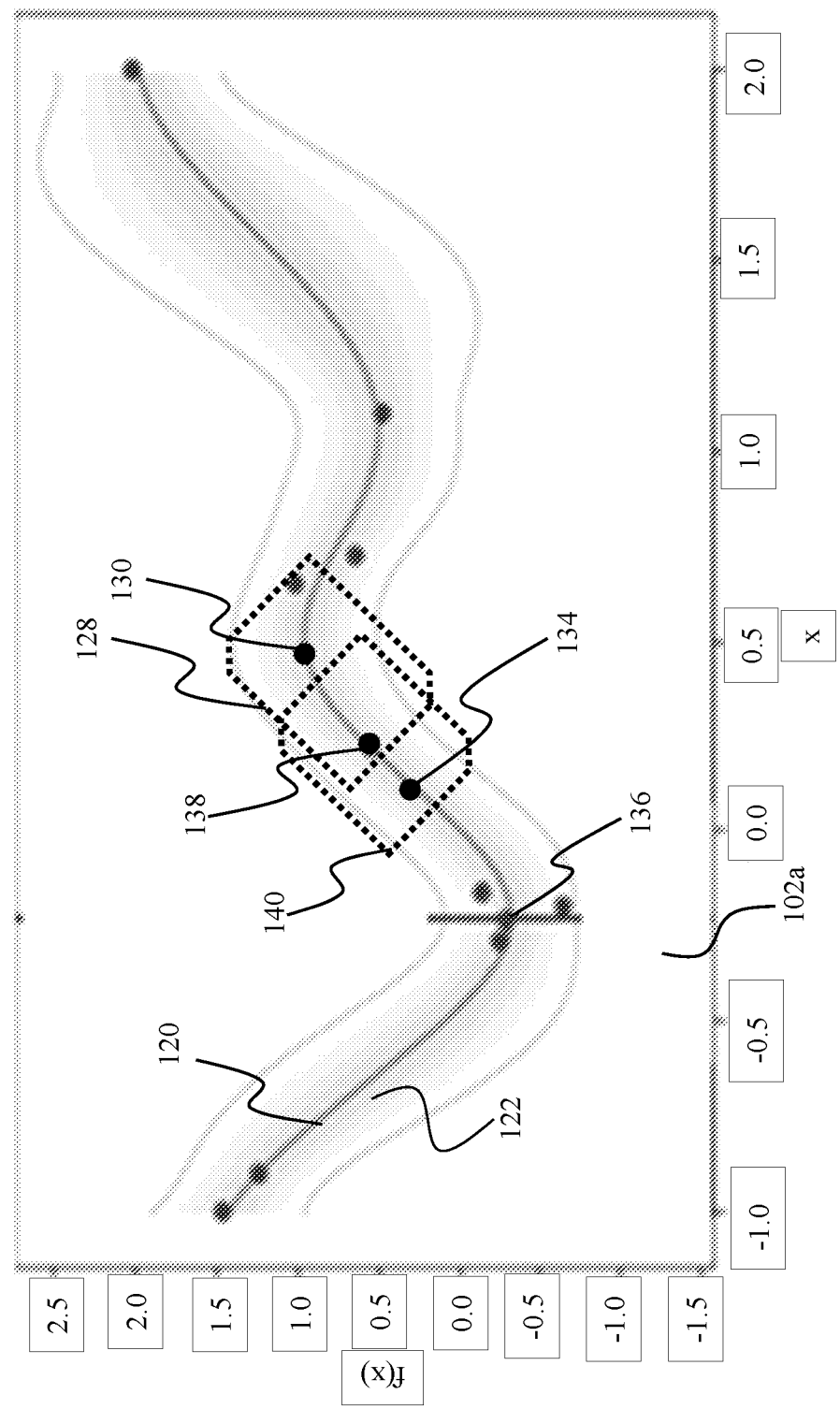
FIG. 1E illustrates a global data point outside the local search space region of the previous data point, according to some embodiments of the present disclosure.

When such situations arise, the LSR-BO globally optimizes the acquisition function 104 to determine the best possible global data point in the global search space 102a in a direction towards a globally optimal data point, as the current data point 108. For instance, the LSR-BO globally optimizes the acquisition function 104 to determine a global data point 134 (also referred to as 'a global combination of setpoints') in the global search space 102a in a direction towards a globally optimal data point 136 (i.e., the global minimum of the probabilistic surrogate model 102), as shown in FIG. 1E. Since the global data point 134 lies outside the local search space region 128 of the previous data point 130, the global data point 134 may not satisfy the LSR constraint 106 and, thus, may not be a feasible point.

To guarantee the satisfaction of the LSR constraint 106, the global data point 134 is projected onto the local search space region 128 of the previous data point 130, which implies as taking the largest possible feasible step in the direction of the globally optimal data point 136. For example, to reach the global data point 134, the global data point 134 is projected onto the local search space region 128 and a data point 138 from the local search space region 128 in the direction of the globally optimal data point 136, is selected. Further, the global data point 134 within a local search space region 140 around the data point 138, is selected. In other words, instead of reaching the global data point 136 in a single unsafe step, the global data point 136 is reached via multiple safe steps while satisfying the LSR constraint 106 at each step. The determination of the global data point 134 projected onto the local search space region 128 of the previous data point 130, as the current data point 108, is referred to as a global optimality objective.

To that end, the LSR-BO needs to balance between the local optimality objective (i.e., take a nearby safe step when there is a chance of improving upon the previous data point) and the global optimality objective (i.e., take multiple safe steps towards a new region of the global search space when the local space search is exhausted) to determine the current data point 108. Specifically, the acquisition function 104 of the LSR-BO needs to switch between the local optimality objective and the global optimality objective to determine the current data point 108.

In some embodiments, the switching between the local optimality objective and the global optimality objective is achieved based on a user-defined threshold. For instance, if a value of the acquisition function 104 is greater than the user-defined threshold, then the local optimality objective is executed to determine the local data point 132 as the current data point 108 for the current control step. If the value of the acquisition function is lesser than the user-defined threshold, then the global optimality objective is executed, and the global data point projected 134 onto the local search space region 128 of the previous data point 130 is determined as the current data point 108 for the current control step. In such a manner, the acquisition function 104 switches between the local optimality objective and the global optimality objective. To that end, in some embodiments, the acquisition function 104 is a switch function including the local optimality objective, the global optimality objective, and a criterion (i.e., user-defined threshold) for switching between the local optimality objective and the global optimality objective. This approach of switching is simple to implement, with less computational and memory requirements, and guarantees convergence to the globally optimal data point.

Further, the determined current data point 108 (i.e., the local data point 132 or the global data point projected 134 onto the local search space region 128 of the previous data point 130) is applied to a feedback controller 110 associated with the VCS 114. The feedback controller 110 is configured to determine control commands corresponding to setpoints in the determined data point 108. Further, the feedback controller 110 controls the operation of the VCS 114 based on the control commands to change the states of the actuators of the VCS 114 according to the determined data point 108. Specifically, in an embodiment, the feedback controller measures an output of the VCS 114 (or a process variable). The measured value is applied as feedback signal 112 to the feedback controller 110. The feedback controller 110 computes an error signal as a difference between the determined current data point 108 and the feedback signal 112. The feedback controller 110 uses control parameters such as a proportional gain, an integral term, and/or a derivative term. The control parameters may be applied to the error signal to determine an input for the VCS to drive the process variable or the VCS output according to the determined data point 108. The feedback controller 110 is one or a combination of a Proportional Integral (PI) controller, a proportional-integral-derivative (PID) controller, a Model Predictive Control (MPC) controller, or a robust controller.

Further, the VCS 114 yields a cost of operation 116 (for example, the power consumption) corresponding to the current data point 108. Further, the current data point 108 and the corresponding current cost of operation 116 are used to update the probabilistic surrogate model 102, using the LSR-BO. Consequently, an updated probabilistic surrogate model is obtained.

Further, in the next control step, the same acquisition function 104 of the LSR-BO is applied to the updated probabilistic surrogate model to determine a new current data point for controlling the VCS 114. According to an embodiment, the LSR-BO is implemented by a controller described below in FIG. 2.

Figure 2:
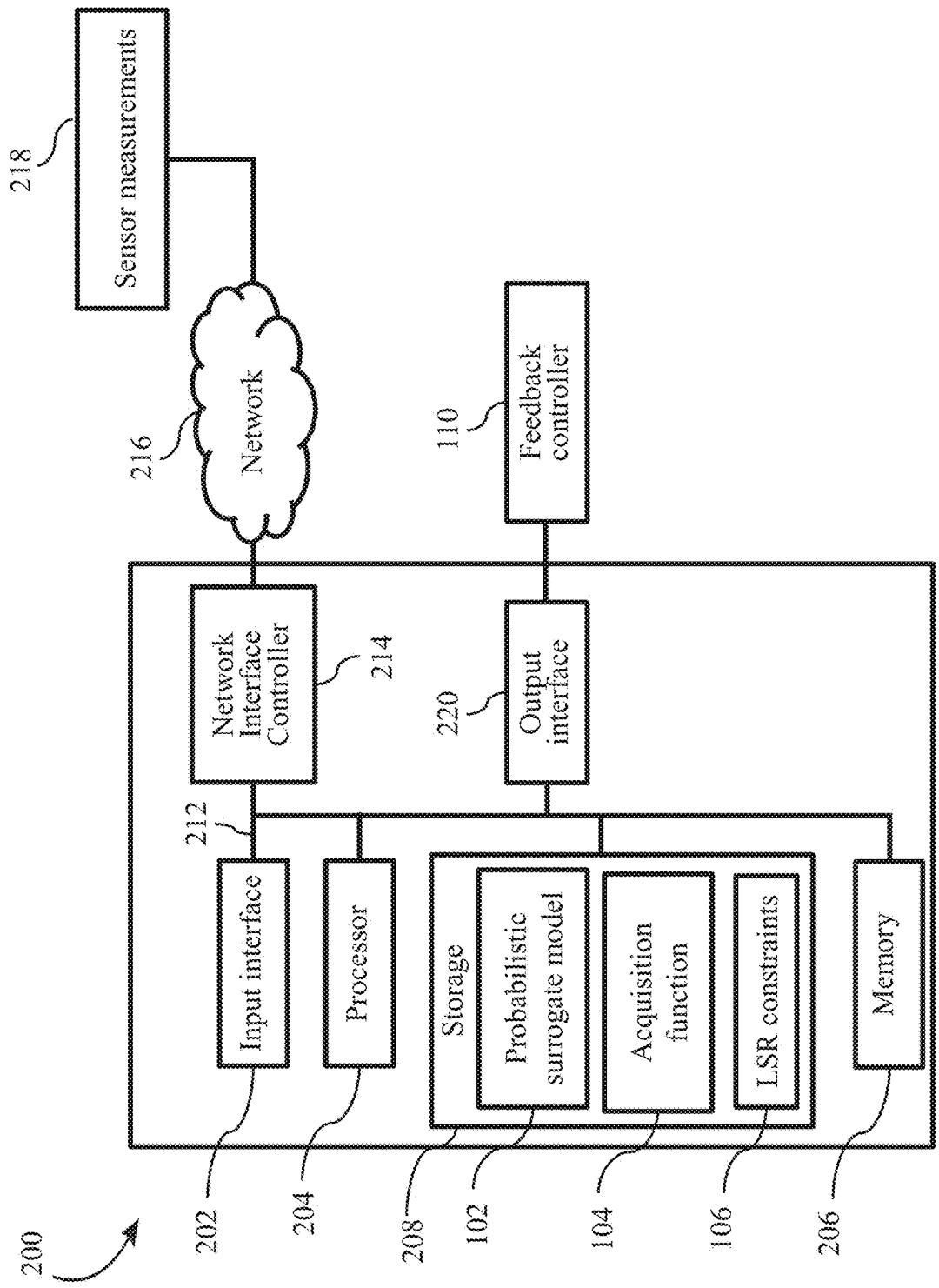
FIG. 2 illustrates a block diagram of a controller for controlling the operation of the vapor compression system, according to some embodiments of the present disclosure.

FIG. 2 illustrates a block diagram of a controller 200, based on the LSR-BO, for controlling the operation of the VCS 114, according to some embodiments of the present disclosure. The controller 200 can have a number of interfaces connecting the controller 200 with other systems and devices. For example, a network interface controller (NIC) 214 is adapted to connect the controller 200, through a bus 212, to a network 216. Through the network 216, either wirelessly or through wires, the controller 200 may receive sensor measurements 218 indicative of one or more of a speed of the indoor fan, a speed of the outdoor fan, the position of the expansion valve, a speed of the compressor, the performance output 112 the VCS 114, and the like. Additionally or alternatively, the sensor measurements 218 may be received via an input interface 202. The controller 200 may monitor the operation of the components of the VCS 114 based on the sensor measurements.

The controller 200 includes a processor 204 configured to execute stored instructions, as well as a memory 206 that stores instructions that are executable by the processor 204. The processor 204 can be a single-core processor, a multi-core processor, a computing cluster, or any number of other configurations. The memory 206 can include random access memory (RAM), read-only memory (ROM), flash memory, or any other suitable memory system. The processor 204 is connected through bus 212 to one or more input and output devices. Further, the controller 200 includes a storage device 208 adapted to store different modules storing executable instructions for the processor 204. The storage device 208 can be implemented using a hard drive, an optical drive, a thumb drive, an array of drives, or any combinations thereof.

The storage device 208 is configured to store the probabilistic surrogate model 102 providing a probabilistic mapping between various combinations of setpoints for different actuators of the VCS and their corresponding costs of operation. The storage device 208 is further configured to store the acquisition function 104. The acquisition function 104 is used to select a combination of setpoints (i.e., a data point) to query/sample next. The storage device 208 is further configured to store the LSR constraint 106. The LSR constraint 106 restricts a distance between the current combination of setpoints and the previous combination of setpoints.

In some embodiments, the processor 204 is configured to collect data points indicative of control of the operation of the VCS with different combinations of setpoints for different actuators of the VCS 114 and corresponding costs of operation of the VCS 114 for each of the different combinations of setpoints, and compute, using the LSR-BO of the combinations of setpoints and their corresponding costs of operation, the probabilistic surrogate model providing the probabilistic mapping between various combinations of setpoints for different actuators of the VCS 114 and their corresponding costs of operation. The probabilistic surrogate model defines at least first two order moments of the cost of operation in the probabilistic mapping. The processor 204 is further configured to select from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model.

The processor 204 is further configured to submit, via an output interface 220, the current combination of setpoints to the feedback controller 110 to control the actuators of the VCS 114 at a current control step according to their corresponding setpoints in the current combination of setpoints to collect a current cost of operation. The processor 204 is further configured to update the collected data points with the current combination of setpoints and the corresponding current cost of operation.

In an embodiment, the data points collected by the processor 204 are determined offline (i.e., before starting real-time operation). The data points determined offline may not satisfy the LSR constraint 106. The offline determined data points are described below in FIG. 3A.

Figure 3A:
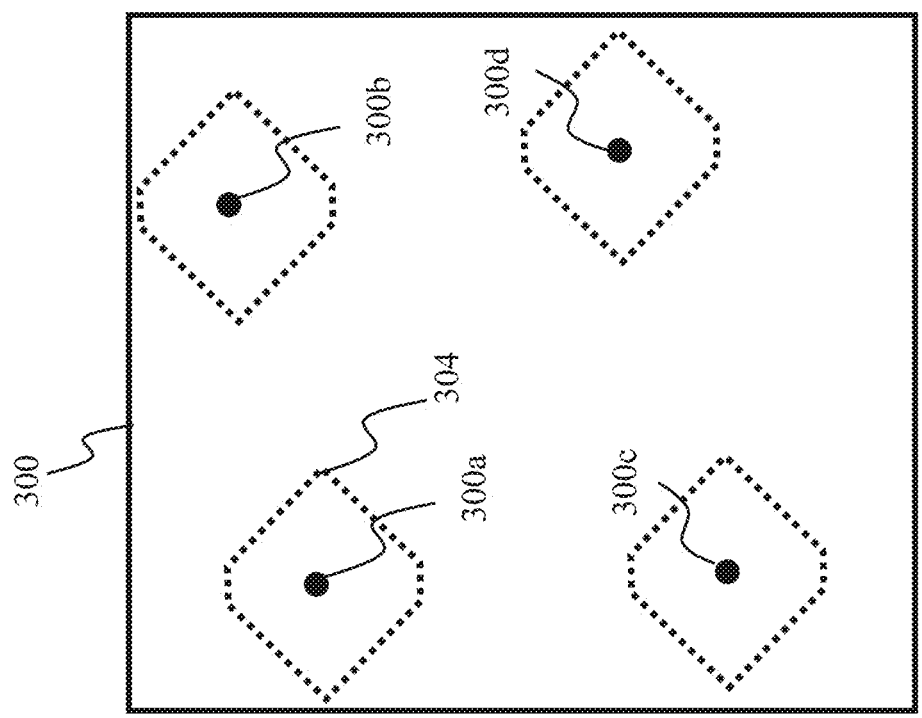
FIG. 3A illustrates offline determined data points, according to some embodiments of the present disclosure.

FIG. 3A illustrates offline determined data points 300, according to some embodiments of the present disclosure. The offline determined data points 300, for example, include data points 300a-300d. Dotted box (e.g., box 304) around each data point is a local search space region defined by the LSR constraint 106. The offline determined data points 300a-300d are collected from a global search space of admissible setpoints, by resetting the VCS 114. For example, a combination of set points is selected from the global search space 102a, and the VCS 114 is operated for a time period based on the selected combination of set points to determine a cost of operation. Such a process constitutes obtaining a data sample or data point from the VCS 114, given the combination of set points, Likewise, for instance, four such data points 300a-300d are obtained. The data points 300a-300d do not satisfy the LSR constraint 106. Based on the data points 300a-300d, a probabilistic surrogate model may be computed. Such a probabilistic surrogate model is advantageous. For example, since the data points 300a-300d are determined by searching over the global search space, the probabilistic surrogate model computed using the data points 300a-300d provides global information.

Figure 3B:
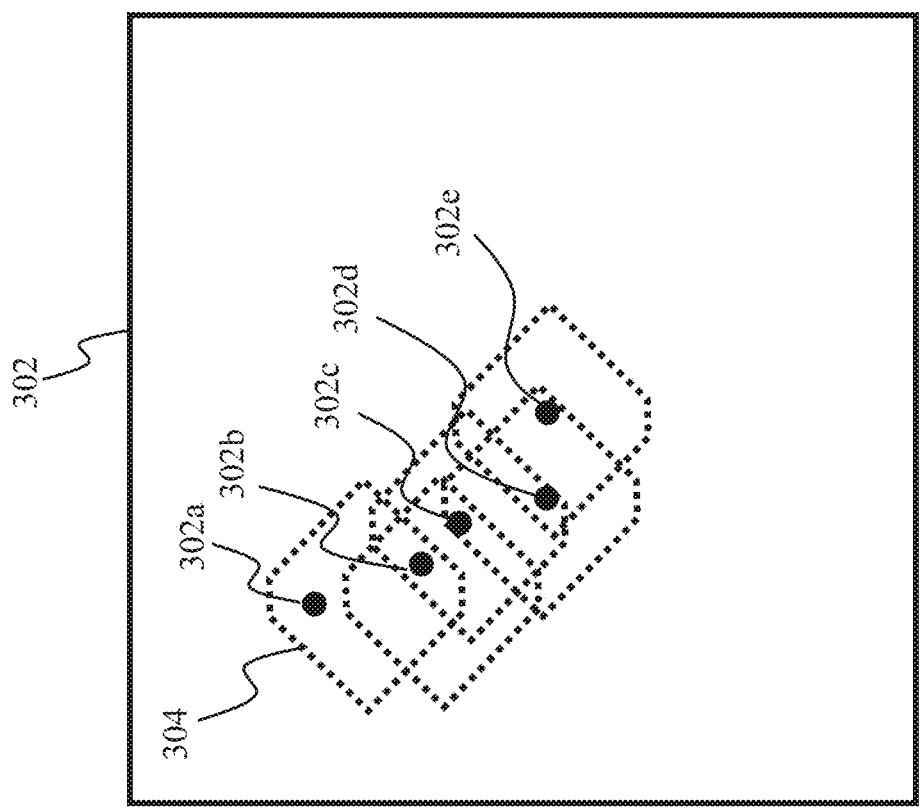
FIG. 3B illustrates online determined data points, according to some embodiments of the present disclosure.

In some alternate embodiments, the data points collected by the processor 204 are determined online (i.e., during real-time operation). FIG. 3B illustrates online determined data points 302, according to some embodiments of the present disclosure. The online determined data points 302, for example, include data points 302a-302e. Dotted box (e.g., box 304) around each data point is the local search space region defined by the LSR constraint 106. At first, an initial data point, e.g., data point 302a, is selected from the global search space. Next, a consecutive data point 302b is selected from the local search space region 304 to satisfy the LSR constraint 106. Likewise, the remaining data points 302c-302e are selected while satisfying the LSR constraint 106. To that end, the consecutive data points 302a-302e satisfy the LSR constraint 106. Further, a probabilistic surrogate model is computed using the data points 302c-302e.

However, such a probabilistic surrogate model may not provide the global information. To mitigate such a problem, the probabilistic surrogate model is computed based on both the offline determined data points 300a-300d and the online determined data points 302a-302e. For example, in an embodiment, during online operation, the LSR-BO is initialized with the offline determined data points 300a-300d. Further, the LSR-BO selects a starting data point from the offline determined data points 300a-300d and determines consecutive data points while satisfying the LSR constraint 106. Further, the probabilistic surrogate model 102 is computed based on both the offline determined data points 300a-300d and the online determined data points that satisfy the LSR constraint 106.

According to an embodiment, the LSR constraint 106 is a norm-ball centered on the current combination of setpoints. The LSR constraint 106 is mathematically described below.

Consider a class of stable closed loop systems of a form $$x_+ = f(x, \theta) \quad (1)$$

where $x \in R^{nx}$ and $x_+ \in R^{nx}$ denote a current and next step successor state of the system (e.g., VCS 114), respectively, and $\theta \in \Theta \subset R^d$ denotes data point indicative of a combination of setpoints to be assigned. It is assumed that admissible set $\Theta$ of the set points is known at design. To ascertain performance of the closed-loop system, the existence of a function $J: \Theta \to R$ is assumed such that $J(\theta)$ effectively quantifies system performance for any fixed $\theta \in \Theta$. The closed-loop performance optimization then requires solving for $$\theta^* \in \underset{\theta \in \Theta}{\mathrm{argmax}} J(\theta), \quad (2)$$

where $\theta^*$ denotes a globally optimal combination of setpoints. Characteristics of the function J and domain $\Theta$ restrict types of algorithms that can be used to solve (2). In real-world applications, a structure of J is unknown and may be highly non-convex in nature. This is true when attempting to solve (2) using closed-loop data collected from an online experimental system wherein a relationship between $\theta$ and $J(\theta)$ can be very complex. It is assumed that the objective function J can be evaluated, either by measurement or some estimation procedure, once the experiment is completed. Thus, some embodiments aim to find a data point $\theta \in \Theta$ with the smallest possible objective value by querying J at a sequence of points $\{\theta_k\}_{k=1}^N$ over a finite budget of N function evaluations (total experiments).

Since a mathematical representation of the function J is completely unknown, the function J is endowed with a prior probability distribution, denoted by p. This setting matches that of Bayesian optimization, which determines the next data $\theta_{k-1}$ given a complete set of current observations $D_k$, by solving an auxiliary problem of form $$\theta_{k+1} = \mathrm{argmax}\ \alpha_{k+1}(\theta_k | D_k),$$

where $\alpha_{k+1}: \Theta \to R$ denotes an acquisition function, which is defined in terms of a current posterior distribution for $J \sim p(J|D_k)$ conditioned on the observations $D_k$. However, Bayesian optimization determines subsequent data points $\theta_k$ and $\theta_{k+1}$ that are far apart, which leads to significant practical challenges. Such a problem can be addressed by restricting the data point $\theta_{k+1}$ to be within a user defined neighborhood of the data point $\theta_k$, using the LSR constraint 106 given as follows $$\theta_{k+1} \in B_\delta(\theta_k), \forall k \in \{0, \ldots, N-1\}, \quad (3)$$

where $$B_\delta(\theta) = \{\theta_+ \in \Theta : \|\theta_+ - \theta\|_p \leq \delta\} \quad (4)$$

denotes a p-norm ball of radius $\delta > 0$ centered at the setpoint $\theta$.

In an embodiment, the acquisition function 104 is an expected improvement (EI) function, given by $$EI_k(\theta) = \mathbb{E}_\pi[(J(\theta) - J_k^*)^+ | \mathcal{D}_k] \quad (5)$$

where $a^+ = \max(a, 0)$ and $$J_k^* = \max_{(\theta, J(\theta)) \in \mathcal{D}_k} J(\theta), J(\theta)$$

is an incumbent solution that corresponds to the best objective value observed so far. The following closed-form expression for EI has been derived $$EI_k(\theta) = \rho(\mu_k(\theta) - J_k^*, \tau_k(\theta)), \quad (6)$$

where $$\rho(y, s) = \begin{cases} y\Phi(y, s) + s\phi(y/s), & s > 0 \\ \max(y, 0), & s = 0 \end{cases} \quad (7)$$

and $\Phi$ and $\phi$ denote a standard normal cumulative density function and probability density function, respectively. The LSR-BO leverages the EI acquisition function to determine the data point $\theta_{k+1}$, as described below in FIG. 4.

Figure 4:
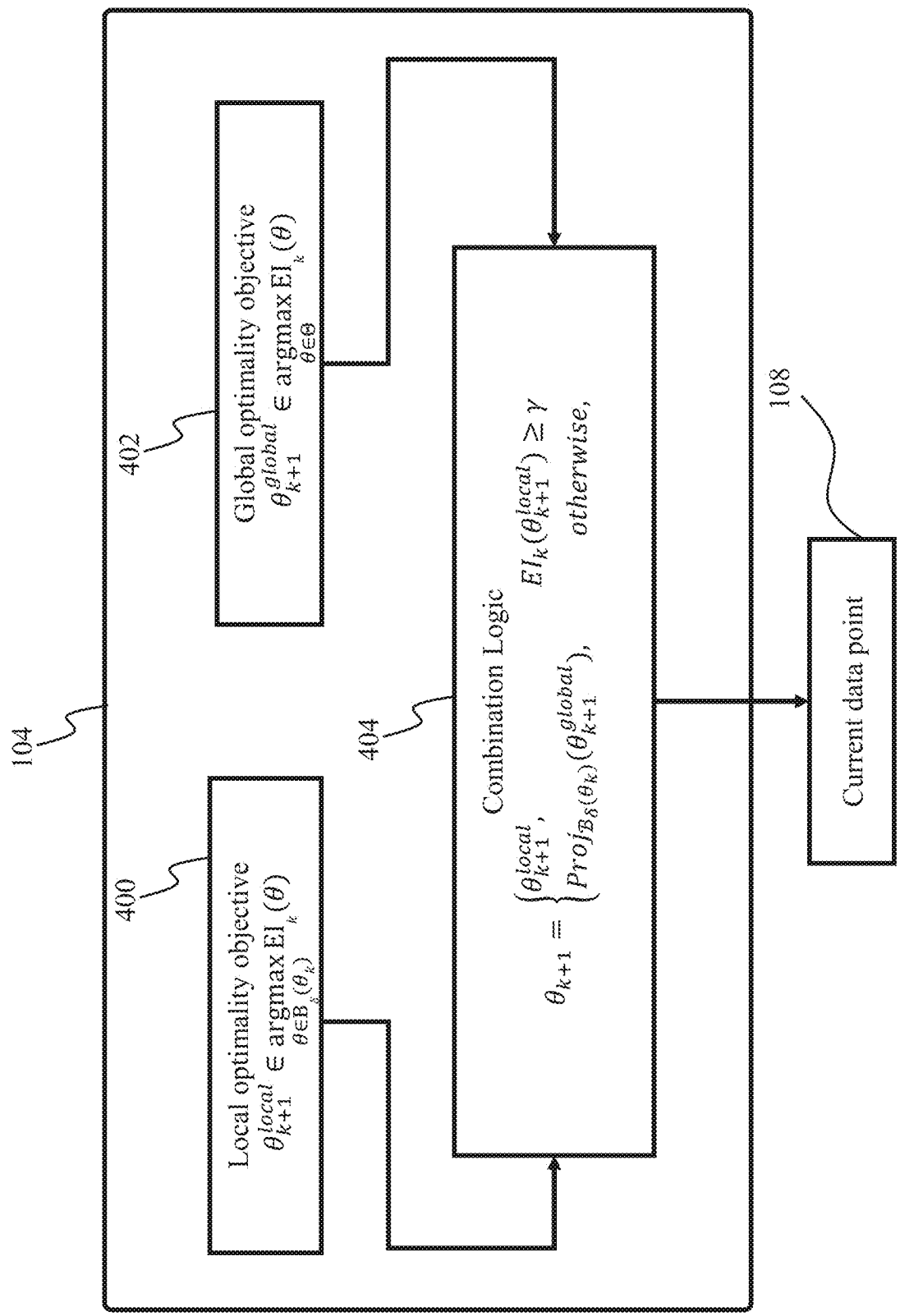
FIG. 4 illustrates a block diagram for an acquisition function used by Local Search Region constrained Bayesian Optimization (LSR-BO), according to some embodiments of the present disclosure.

FIG. 4 illustrates a block diagram for the acquisition function 104 used in the LSR-BO, according to some embodiments of the present disclosure. The LSR-BO executes a local optimality objective 400, by optimizing the EI acquisition function over a local search space region defined by (3), to determine a local data point $\theta_{k+1}^{local}$ that has the best chance of improving upon the incumbent solution, i.e., $$\theta_{k+1}^{local} \in \operatorname*{argmax}_{\theta \in B_\delta(\theta k)} EI_k(\theta) \quad (8)$$

By construction, the local data point $\theta_{k+1}^{local}$ satisfies the LSR constraint (3), however, it is possible that no nearby point is likely to improve upon the incumbent solution. Such a case occurs whenever the largest EI value in the local search space region is small, indicating the local search space region has been sufficiently well-explored and, thus, the local data point $\theta_{k+1}^{local}$ is not an optimal sample choice.

When such situations arise, the LSR-BO executes a global optimality objective 402, by globally optimizing the EI acquisition function to determine a global data point $\theta_{k+1}^{global}$ in the global search space, as follows $$\theta_{k+1}^{global} \in \operatorname*{argmax}_{\theta \in \Theta} EI_k(\theta) \quad (9)$$

Since the global data point $\theta_{k+1}^{global}$ may not satisfy LSR constraint (3), the function J cannot be evaluated at the global data point $\theta_{k+1}^{global}$. To guarantee the satisfaction of the LSR constraint (3), the global data point $\theta_{k+1}^{global}$ is projected onto $B_\delta(\theta_k)$, which implies as taking the largest possible feasible step in the direction of the globally optimal data point. Thus, the LSR-BO needs to switch between the local optimality objective 400 and the global optimality objective 402. The switching between the local optimality objective 400 and the global optimality objective 402 is achieved by a combination logic 404 given by $$\theta_{k+1} = \begin{cases} \theta_{k+1}^{local}, & EI_k\left(\theta_{k+1}^{local}\right) \geq \gamma \\ \operatorname{Proj}_{\mathcal{B}_\delta(\theta_k)}\left(\theta_{k+1}^{global}\right), & \text{otherwise,} \end{cases} \quad (10)$$

where $\gamma$ is a user-defined threshold that controls a degree of local search. Based on properties of the EI acquisition function, the above equation (10) reduces to greedy local and a global search whenever $\gamma=0$ and $\gamma=\infty$, respectively. For instance, if the EI value is greater than the user-defined threshold, then the local optimality objective 400 is executed to determine the local data point $\theta_{k+1}^{local}$ as the current data point 108 for the current control step. If the EI value is lesser than the user-defined threshold, then the global optimality objective 402 is executed, and the global data point $\theta_{k+1}^{global}$ projected onto $B_\delta(\theta_k)$ is determined as the current data point 108 for the current control step.

In some other embodiments, the acquisition function 104 is determined based on an Approximate Dynamic Programming (ADP). In one embodiment, the ADP is implemented using a multistep lookahead that uses one or a combination of a base policy, a rollout policy, and a policy search method. The base policy is computed by solving an auxiliary optimization problem.

Figure 5:
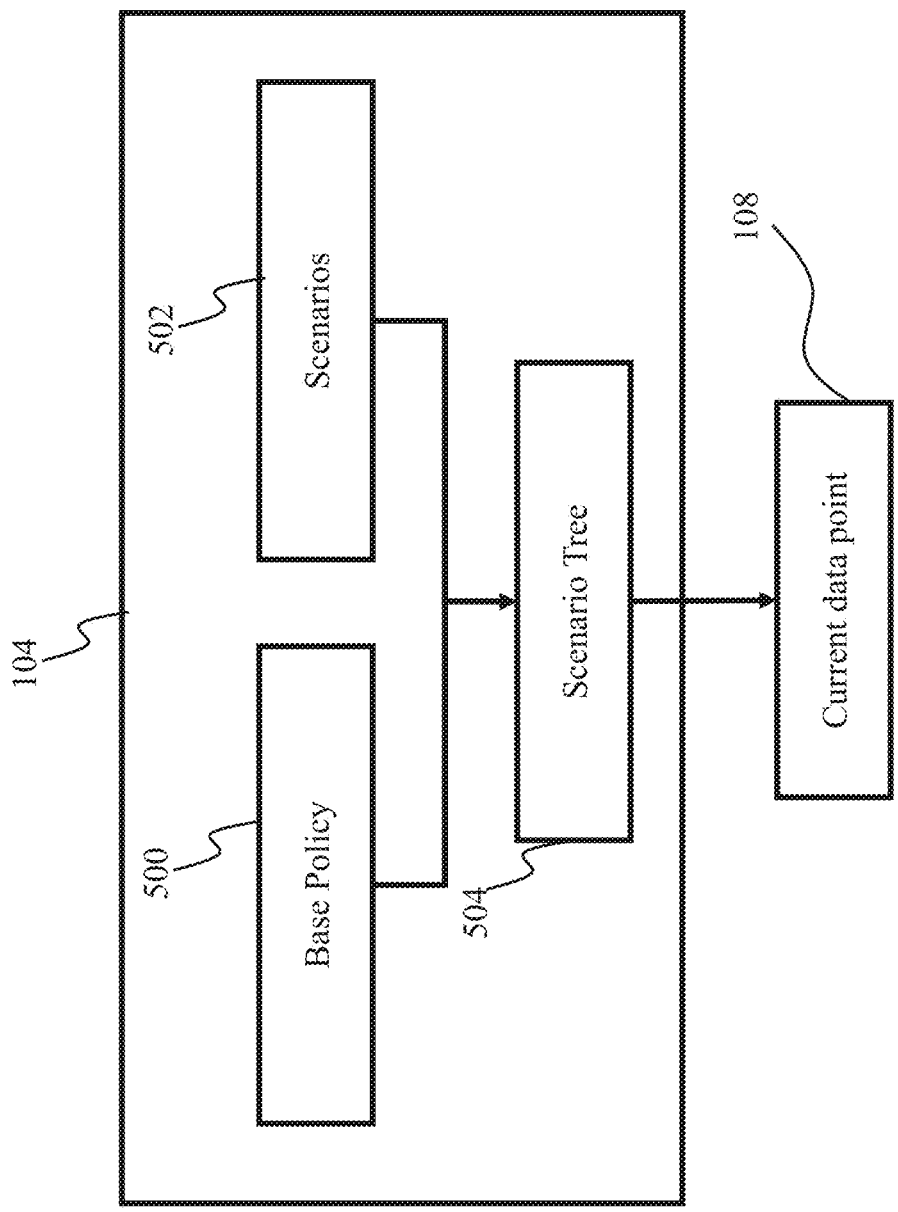
FIG. 5 illustrates a schematic of an acquisition function based on an Approximate Dynamic Programming (ADP), according to some embodiments of the present disclosure.

FIG. 5 illustrates the acquisition function 104 based on the ADP, according to some embodiments of the present disclosure. Some embodiments are based on recognition that Bayesian optimization with the LSR constraints 106 can be treated as an instance of N-stage Dynamic Programming (DP) by casting it as a finite-horizon Markov Decision Process (MDP), which is expressed in terms of a chosen "state" space and "action" space. A state of the MDP at iteration k is $D_k$. An action of the MDP at iteration k is $\theta_{k+1}$. The state of the closed loop system is then defined recursively as follows $$D_{k+1} = D_k \cup \{(\theta_{k+1}, J_{k+1})\} \quad (11)$$

where $J_{k+1}$ denotes a predicted value of the function J at $\theta_{k+1}$ generated according to available probabilistic model $p(J(\theta_{k+1})|D_k))$. Based on the probabilistic model, a simulated objective value of $J_{k+1}$ may be represented as follows $$J_{k+1} \sim \mathcal{N}(\mu_k(\theta_{k+1}), \sigma_k^2(\theta_{k+1})). \quad (12)$$

Consequently, by re-parameterization $J_{k+1}$ is expressed in terms of an effective stochastic disturbance $w_{k+1} \sim \mathcal{N}(0,1)$ such that the simulated objective value only depends on the current system state $D_k$ and the current action $\theta_{k+1}$, i.e., $J_{k+1}=\mu_k(\theta_{k+1})+\sigma_k(\theta_{k+1})w_{k+1}$.

Based on a structure of the imposed LSR constraints and stochastic dynamics, the resulting system satisfies Markov property, that is, a predicted state distribution and constraints are conditionally independent of previous state values given the current state.

In ADP parlance, let $\pi=\{\pi_1, \pi_2, \ldots, \pi_N\}$ denote a policy that represents a sequence of functions $\pi_k$. Each $\pi_k$ maps from sets of available observations to feasible points in the global search space that satisfy the LSR constraints, $$\theta_k = \pi_k(D_{k-1}) \in T_{k-1}(\theta_{k-1}) \tag{13}$$

To define an optimal policy, an overall reward function is needed to evaluate quality of different policies. Utility generated by a state $D_k$ is defined to be a negative of the minimum observed objective function value $$u(D_k) = - \min_{(\theta,J) \in D_k} J. \tag{14}$$

Given an acquisition function u, an initial set of observations (or data points) $D_0$, and a policy $\pi$, a corresponding value function is defined as an expected increase in utility $$V_\pi(D_0) = \mathbb{E}\left[\sum_{k=1}^N r(D_k, D_{k-1})\right] \tag{15}$$

where an expectation operator is defined with respect to future objective value observations and $r(D_{k-1}, D_k)=u(D_k)-u(D_{k-1})$ is utility increase between control steps. An optimal policy $\pi^*$ is the one that maximizes the expected utility over a set of feasible policies $\Pi$ satisfying the LSR constraints. Formally, $$V^*(\mathcal{D}_0) = V_{\pi^*}(\mathcal{D}_0) = \max_{\pi \in \Pi} V_\pi(\mathcal{D}_0) \tag{16}$$

where V* denotes an optimal value function.

Using Bellman's principle of optimality, V* can be recursively computed using the following DP algorithm $$V_k(\mathcal{D}) = \max_{x+ \in \mathcal{T}_{N-k}(x)} \mathbb{E}_{\mathcal{D}} + [r(\mathcal{D}, \mathcal{D}^+) + V_{k-1}(\mathcal{D}^+)] \tag{17}$$

for all $k=1, \ldots, N$ starting from an initial value of $V_0(D)=0$, where $V_k(D)$ denotes the optimal value function for a tail subproblem defined in terms of k remaining stages and $D^+=D\cup\{\theta^+,J^+\}$ is a successor set of observations. The optimal value function then corresponds to $V_N(D_0)$.

Furthermore, it can be asserted that if the value of $\theta^+$ that maximizes the right-hand side of $V_k(D)$ is selected for all k and all D, then the resulting policy must be equal to that of the optimal policy $\pi^*$.

Some embodiments are based on the recognition that it is useful to express $V_k(D)$ in terms of the optimal Q-factors (also known as the state-action value function in reinforcement learning literature)

$$Q_k(\theta|\mathcal{D}) = \mathbb{E}_J[r(\mathcal{D}, \mathcal{D}\cup\{(\theta,J)\}) + V_{k-1}(\mathcal{D}\cup\{(\theta,J)\})] \tag{18}$$

which represents the optimal value of the tail sub-problem when starting at state D and taking action $\theta$ at iteration N–k and following an optimal policy for all remaining steps. A relationship between the value function and the Q-factor may be given as:

$$V_k(\mathcal{D}_{N-k}) = \max_{\theta \in \mathcal{T}_{N-k}(\theta_{N-k})} Q_k(\theta|\mathcal{D}_{N-k}) \tag{19}$$

To that end, the optimal policy can be defined in terms of the Q-factor, for all $k=1, \ldots, N$, as $$\pi_k^*(\mathcal{D}_{k-1}) = \arg\max_{\theta \in \mathcal{T}_{k-1}(\theta_{k-1})} Q_{N-k+1}(\theta|\mathcal{D}_{k-1}) \tag{20}$$

in terms of the Q-factor, for all $k=1, \ldots, N$.

Equation (20) may be solved by using the ADP. For example, in an embodiment, the rollout policy is used and stochastic simulations are generated to approximate $Q_{k-1}$ or $V_{k-1}$ over multiple future time steps. A computational advantage of the rollout policy is that it relaxes a requirement that future data points be selected optimally by using a suboptimal heuristic policy to decide which action to take in a given state.

To derive rollout updates, a heuristic base policy 500 $\tilde{\pi}=\{\tilde{\pi}_1, \ldots, \tilde{\pi}_N\}$ that may differ from the optimal policy $\pi^*$ is defined. Given such a base policy, let $V_k(\tilde{\pi})$ denote its corresponding value function for k remaining steps, which is described by recursion for $k=1, \ldots, N$ $$V_k^{\tilde{\pi}}(\mathcal{D}) = \mathbb{E}_{\mathcal{D}^+}[r(\mathcal{D}, \mathcal{D}^+) + V_{k-1}^{\tilde{\pi}}(\mathcal{D}^+)] \tag{21}$$

where $D^+=D\cup\{\tilde{\pi}_{N-k+1}(D), J_{N-k+1}\}$ and $V_0^{\tilde{\pi}}(D)=0$.

Some embodiments are based on the recognition that though (21) has reduced complexity of the DP algorithm, two additional approximations are to be made to derive a tractable policy. First, a shortened horizon $h \leq N$ is used to limit a number of steps that need to simulate forward in time. Second, expectation is approximated with a numerical method such as quadrature or Monte Carlo (MC) integration. Due to a nested structure of the expectation, it may require an exponentially growing number of quadrature points at each step. The rollout policy may be defined as follows:

$$\pi_k^{roll}(\mathcal{D}_{k-1}) = \arg\max_{\theta \in \mathcal{T}_{k-1}(\theta_{k-1})} \tilde{Q}_k^{\tilde{\pi}}(\theta|\mathcal{D}_{k-1}) \tag{22}$$

where $\tilde{Q}_h^{\tilde{\pi}}$ is an approximate Q-factor (for only h steps ahead) constructed using MC. Although computing $\tilde{Q}_h^{\tilde{\pi}}$ is tractable, it is not simple to numerically optimize. To that end, a policy search method is used to parameterize the base policy 500 in terms of some unknown parameters $\gamma \in \Gamma$ and then directly optimize over the newly defined space. Some embodiments employ time-invariant base polices of form $\tilde{\pi}(\gamma)=\{\tilde{\pi}_1(\gamma), \ldots, \tilde{\pi}_N(\gamma)\}$ as these reduce dimensionality of the policy search method and the following policy search-based rollout policy is defined $$\pi_k^{ps}(\mathcal{D}_{k-1}) = \arg\max_{\gamma \in \Gamma} \tilde{V}_k^{\tilde{\pi},\gamma}(\mathcal{D}_{k-1}) \tag{23}$$

where $\tilde{V}_k^{\tilde{\pi}_\gamma}$ is an approximated value function evaluated at a given state D and policy $\tilde{\pi}_{\tilde{\mathcal{D}}_\gamma}$ for an h-step problem. An MC evaluation procedure for $\tilde{V}_k^{\tilde{\mathcal{D}}_\gamma}(\mathcal{D})$ is given below $$\tilde{V}_k^{\tilde{\mathcal{D}}_\gamma}(\mathcal{D}) = \frac{1}{S}\sum_{j=1}^{S}\sum_{i=0}^{h-1} r(\mathcal{D}_i^{(j)}, \mathcal{D}_{i+1}^{(j)}) \qquad (24)$$

where $$\mathcal{D}_{i+1}^{(j)} \mathcal{D}_i^{(j)} \cup \{(\theta_{i+1}^{(j)}, J_{i+1}^{(j)})\},$$

$$\mathcal{D}_0^{(j)} = \mathcal{D}$$

$$x_{i+1}^{(j)} = \tilde{\pi}_{(\gamma)}(\mathcal{D}_i^{(j)}),$$

$$y_{i+1}^{(j)} = \mu_i^{(j)}(\theta_{i+1}^{(j)}) + \sigma_i^{(j)}(\theta_{i+1}^{(j)}) w_{i+1}^{(j)}$$

S is a number of MC samples, and $\{w_1^{(j)}, \ldots, w_1^{(j)}\}_{j=1}^{S}$ are complete set of uncertainty samples, with each element being drawn from a standard normal distribution.

Further, in some embodiments, the base policy 500 is defined as a solution to the following optimization problem $$\tilde{\pi}_\gamma(\mathcal{D}_k) = \arg\max_{\theta \in \mathcal{T}_k(\theta_k)} Q_1(\theta|\mathcal{D}_k) - \beta\|\theta - \theta_{k+1}^{global}(\mathcal{D}_k)\| \qquad (25)$$

where) $\beta \geq 0$ is a non-negative scalar weight and $\theta_{k+1}^{global}(D_k)$ corresponds to a predicted one-step optimal solution to a problem without LSR constraints:

$$\theta_{k+1}^{global}(D_k) = \arg\max_{\theta \in \Theta} Q_1(\theta|\mathcal{D}_k). \qquad (26)$$

The base policy 500 policy attempts to balance two terms of (25). The first term, $Q_1(\theta|D_k)$, is a one-step optimal acquisition function, which provides a one-step quantification of improvement in the local search space region around the previous data point. The second term $\|\theta-\theta_{k+1}^{global}(D_k)\|$, on the other hand, corresponds to a distance from a suggested one-step globally optimal data point which indicates there is an inherent value to moving toward the globally optimal data point. Since there are two competing objectives, the optimization problem (25) is treated as a multi-objective optimization problem that can be scalarized using a weight factor $\beta$. In an embodiment, the policy search-based rollout policy (23) is used to adaptively select $\beta$ based on predicted future performance.

In some embodiments, the optimization problems (25) and (26) are solved as fast as possible since they are repeatedly called during the rollout procedure. To this end, one-step Q-factor is analytically reformulated for the acquisition function $u(D_k)$ as follows $$Q_1(\theta_{k-1}|D_k) = \mathbb{E}_{J_{k+1}}[\max\{J_{k+1} - \mathcal{U}(D_k), 0\}] = \qquad (27)$$
$$\sigma_k(\theta_{k+1})z_k(x_{k+1})\Phi(z_k(\theta_{k+1})) + \phi(z_k(\theta_{k+1})),$$

where $$z_k(\theta) = \frac{(u(D_k) - \mu_k(\theta))}{\sigma_k(\theta)},$$

and $\Phi$ and $\phi$ denote standard Gaussian cumulative density and probability density functions, respectively. Equation (27) is equivalent to the EI acquisition function.

According to some embodiments, the probabilistic surrogate model 102 can be determined using one or a combination of a Gaussian process regression, a neural process regression, a Bayesian neural network and other variants of machine learning. For instance, the probabilistic surrogate model 102 is determined using the Gaussian process as described below in FIG. 6.

Figure 6:
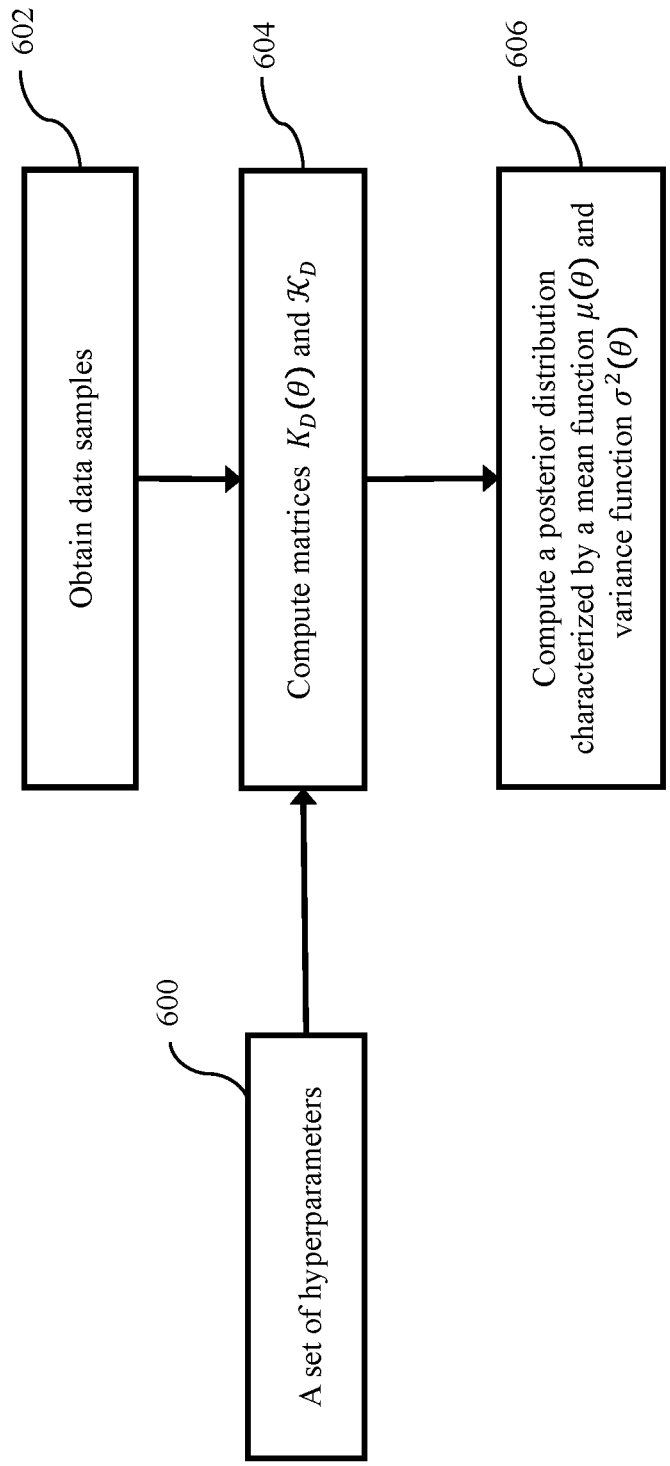
FIG. 6 illustrates a block diagram of a Gaussian process for determining the probabilistic surrogate model, according to some embodiments of the present disclosure.

FIG. 6 shows a block diagram of the Gaussian process for determining the probabilistic surrogate model 102, according to some embodiments. According to an embodiment, the Gaussian processes are used to define a prior distribution over functions. It is assumed that a steady-state power cost function J to be optimized is generated from such a prior distribution, characterized by a zero mean and a kernelized covariance function $\mathcal{K}(\theta,\theta')$. The kernelized covariance function $\mathcal{K}$ is responsible for defining characteristics of the function J such as smoothness, robustness to additive noise, and the like. Some embodiments are based on a recognition that it is beneficial to use Matern 3/2 function, as Matern 3/2 function provides a good approximation of steady-state power functions without over smoothing.

At block 602, data samples are obtained. To that end, a user may select an expansion valve position (e.g., 150 counts), the speed of the indoor unit fan (e.g., 300 rpm), and the speed of the outdoor unit fan (e.g., 750 rpm). Further, the VCS 114 is operated according to the selected values of the VCS 114 parameters for a few minutes (e.g., 5 minutes) to compute the steady-state power consumption. Such a process constitutes obtaining a data sample from the VCS 114, given a set of parameters (150 counts, 300 rpm, and 750 rpm). For instance, five such data samples (at 5 mins per evaluation) are obtained. Let $N_\theta$ denote a number of the data samples. The data samples are denoted by $$\{\theta_k^D, J(\theta_k^D) + v_k\}_{k=1}^{N_\theta} \qquad (28)$$

where $v$ is additive white noise in a measurement channel with zero-mean and unknown covariance.

At block 604, given a set of hyperparameters 600 $l$ and a $\sigma_0$ for a pre-decided kernel, matrices $K_D(\theta)$ and $\mathcal{K}_D$ are computed as $$K_D(\theta) = [\mathcal{K}(\theta,\theta_1^D) \ldots \mathcal{K}(\theta,\theta_N^D)] \qquad (29)$$

and $$\mathcal{K}_D = \begin{bmatrix} \mathcal{K}(\theta_1^D, \theta_1^D) & \ldots & \mathcal{K}(\theta_1^D, \theta_N^D) \\ \vdots & \ddots & \vdots \\ \mathcal{K}(\theta_N^D, \theta_1^D) & \ldots & \mathcal{K}(\theta_N^D, \theta_N^D) \end{bmatrix}. \qquad (30)$$

At block 606, based on the computed matrices $K_D(\theta)$ and $\mathcal{K}_D$, a posterior distribution characterized by a mean function $\mu(\theta)$ and variance function $\sigma^2(\theta)$ is computed. The mean function $\mu(\theta)$ and the variance function $\sigma^2(\theta)$ are given by $$\mu(\theta) = K_D(\theta)^\tau (\mathcal{K}_D + \sigma_n^2 I)^{-1}(J(\theta) + v), \qquad (31)$$

$$\sigma^2(\theta) = \mathcal{K}(\theta,\theta) - K_D(\theta)^\tau (\mathcal{K}_D + \sigma_n^2 I)^{-1} K_D(\theta) \qquad (32)$$

According to an embodiment, the mean function µ(θ) and the variance function σ²(θ) define the probabilistic surrogate model 102. It can be noted from equations (1) and (2) that the posterior distribution is dependent on selection of the kernel and the set of hyperparameters 600 such as l, $\sigma_0$ and $\sigma_n$.

In an embodiment, the set of hyperparameters 600 are determined by maximizing a log-marginal likelihood function $$\mathcal{L}(\sigma_0, \sigma_n, l) = \frac{1}{2}\log|\mathcal{K}_n| - \frac{1}{2}\xi^\top \mathcal{K}_n \xi + \frac{p}{2} \log 2\pi, \quad (33)$$

with $\mathcal{K}_n = \mathcal{K}_D + \sigma_n^2 I$ and $\xi = J(\theta) + \nu$. The problem given by equation (33) can be solved using quasi-Newton methods. In an alternate embodiment, the problem given by equation (33) can be solved using adaptive gradient methods.

Some embodiments are based on the appreciation of the advantages of a multi-zone vapor compression system (MZ-VCS) in controlling residential and commercial premises. In an embodiment, the VCS 114 may correspond to MZ-VCS. The MZ-VCS includes at least a single compressor connected to multiple heat exchangers arranged in one or more indoor zones. The MZ-VCS is described in detail below with reference to FIGS. 7A and 7B.

Figure 7A:
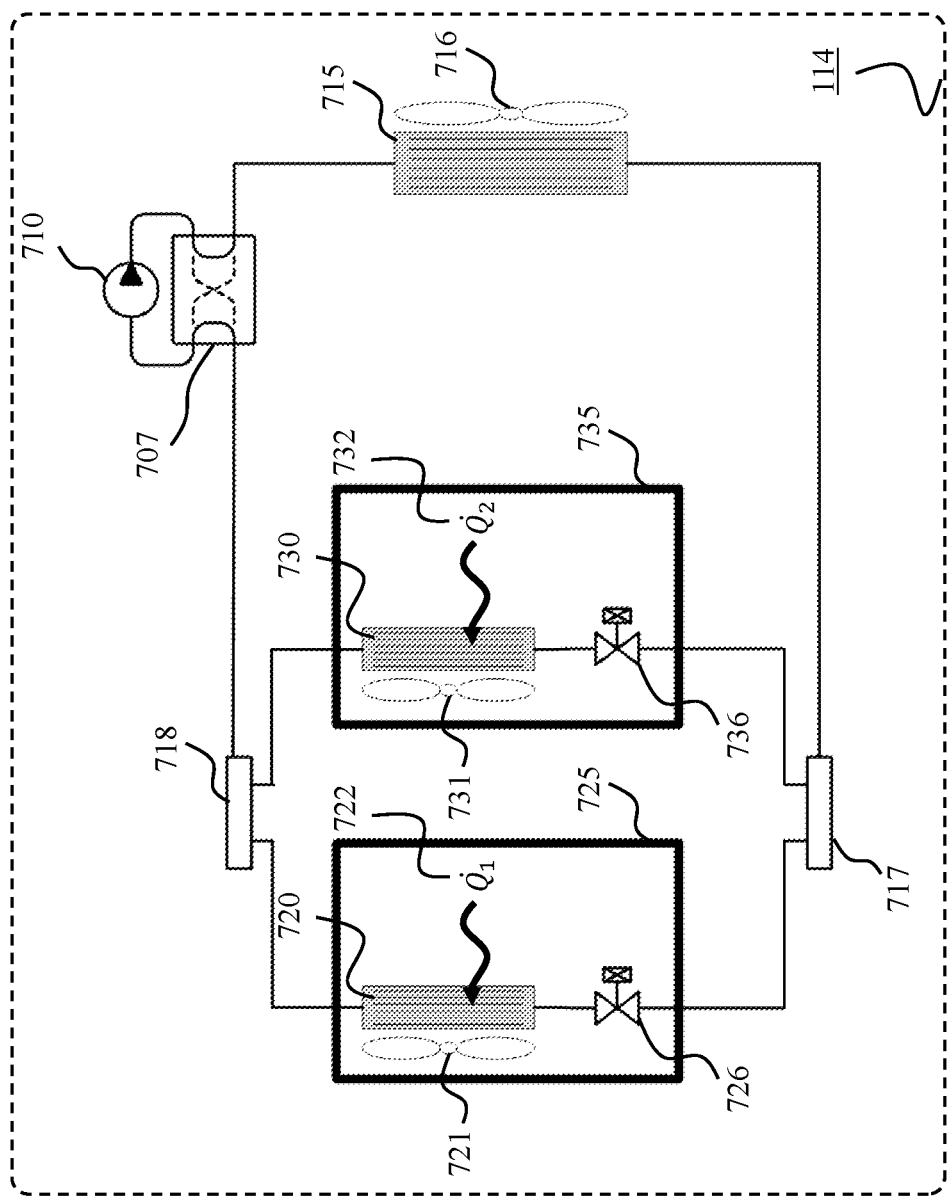
FIG. 7A and FIG. 7B collectively illustrate schematics of a multi-zone vapor compression system (MZ-VCS), according to some embodiments of the present disclosure.
Figure 7B:
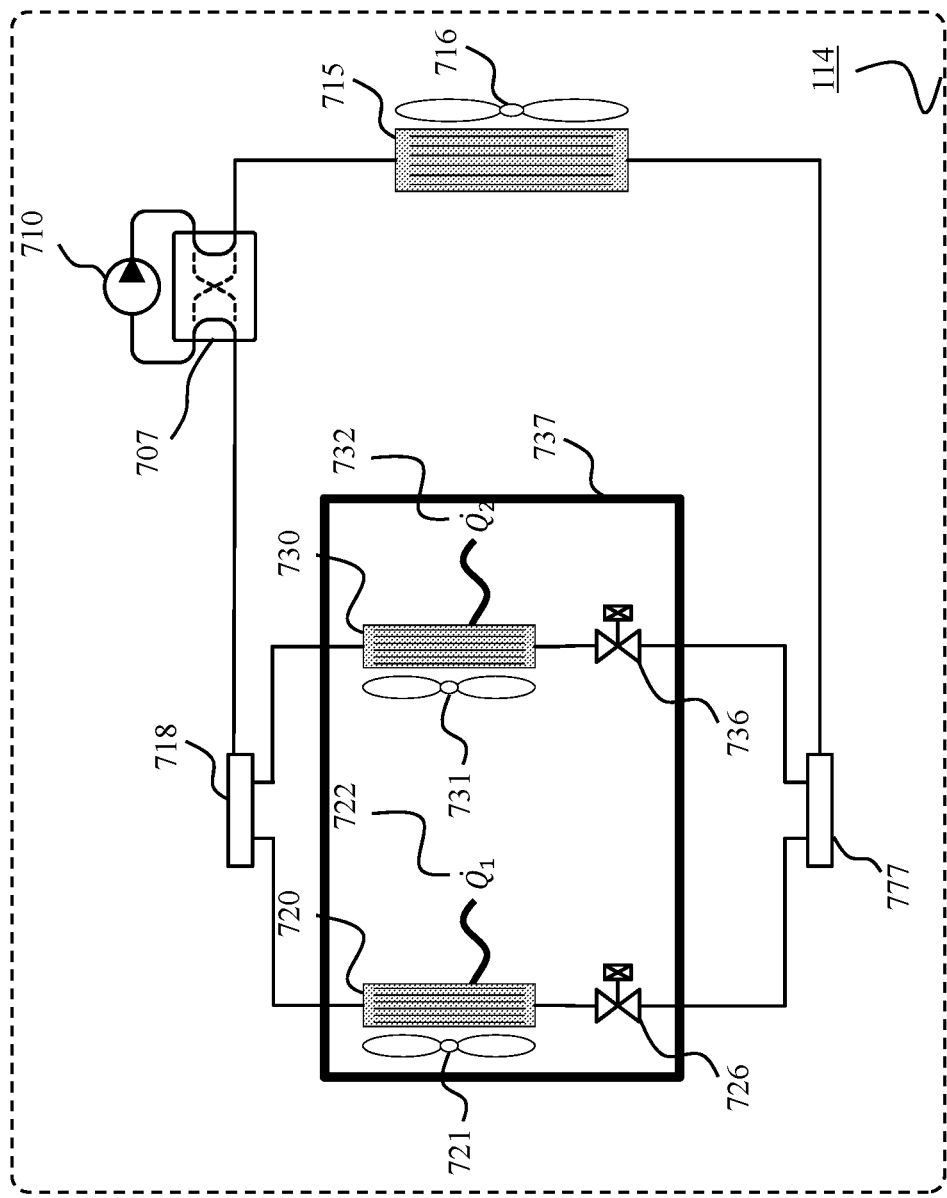

FIG. 7A and FIG. 7B collectively illustrate schematics of the multi-zone vapor compression system (MZ-VCS), according to some embodiments. The MZ-VCS includes a compressor and a set of heat exchangers configured for controlling environments in a set of zones. At least one heat exchanger is provided for each zone. For example, in one embodiment of FIG. 7A, zones 725 and 735 corresponds to rooms in a building enabling the MZ-VCS to provide cooling or heating to zones 725 and 735 simultaneously. In an alternative embodiment shown in FIG. 7B, multiple heat exchangers are placed in one room or zone 737 in a building enabling the MZ-VCS to provide cooling or heating to different sections of the zone 737.

In the present disclosure, a two-zone MZ-VCS is described for clarity, but it should be understood that any number of zones can be used, subject to physical limitations of refrigerant line lengths, capacity, and pumping power of the compressor, and building codes. If the zone is an indoor zone, such as a room or a portion of the room, the heat exchangers are indoor heat exchangers.

A compressor 710 receives a low-pressure refrigerant in a vapor state and performs mechanical work to increase pressure and temperature of the refrigerant. Depending on a configuration of a four-way valve 707, the high-temperature refrigerant can be routed to either an outdoor heat exchanger (in which case the system moves heat to the outside environment and is proving useful cooling and is said to operate in cooling mode) or to an indoor heat exchanger (in which case the system moves heat to one or more indoor zones and is proving useful heating and is said to operate in heating mode).

For clarity and in order to simplify the subsequent description, a cooling mode is generally considered, i.e., the compressor 710 is connected to the rest of the vapor compression system as shown as solid lines of the four-way valve 707, but it should be understood that analogous statements can be made about the vapor compression system operating in heating mode with appropriate substitutions of a condenser for an evaporator, condensing temperature for evaporating temperature.

In the cooling mode, the high-temperature, high-pressure refrigerant moves to an outdoor heat exchanger 715 and an associated optional fan 716 blows air across the outdoor heat exchanger 715. Heat is transferred from the refrigerant to the air, causing the refrigerant to condense from a vapor to a liquid.

A phase change process wherein vapor refrigerant condenses from saturated vapor to a two-phase mixture of both liquid and vapor to saturated liquid is isothermal in ideal descriptions of the vapor compression cycle, that is, the phase change process occurs at a constant temperature and therefore without a sensible change in temperature. However, if further heat is removed from the saturated liquid, the temperature of the saturated liquid then decreases by an appropriate amount, and the refrigerant is termed "subcooled." The sub cool temperature is a temperature difference between the subcooled refrigerant and a calculated saturated liquid refrigerant temperature at the same pressure.

The liquid high-temperature refrigerant exits the outdoor heat exchanger 715 and is split by a manifold 717 in order to distribute the refrigerant between the subsequently connected zones 725, 735, or 737. Separate expansion valves 726, 736 are connected to an inlet manifold. The expansion valves 726, 736 are restriction elements and cause the pressure of the refrigerant to be substantially reduced. Since the pressure is quickly reduced without substantial heat exchange in the expansion valves, the temperature of the refrigerant is substantially reduced, termed "adiabatic" in ideal descriptions of the vapor compression cycle. The resulting refrigerant exiting the valves is a low pressure, low-temperature two-phase mixture of liquid and vapor.

Two-phase refrigerant enters indoor heat exchangers 720, 730 where associated fans 721 and 731 blow air across the heat exchangers 720 and 730, respectively. Heat 722, 732 representing thermal loads from the zones is transferred from the zones to the refrigerant, causing the refrigerant to evaporate from a two-phase mixture of liquid and vapor to a saturated vapor state.

The phase change process wherein refrigerant evaporates from saturated vapor to the two-phase mixture of both liquid and vapor is isothermal in ideal descriptions of the vapor compression cycle, i.e., occurs at a constant temperature and therefore is a process that occurs without a sensible change in temperature. However, if further heat is added to the saturated vapor, the temperature of the saturated vapor then increases by an appropriate amount and the refrigerant is termed "superheated." The superheat temperature is a difference between the superheated refrigerant vapor and a calculated saturated vapor temperature at the same pressure.

The low-pressure refrigerant vapor exiting the indoor unit heat exchangers 720, 730 is rejoined to a common flow path at an outlet manifold 718. Finally, low-pressure refrigerant vapor is returned to the compressor 710, and the cycle repeats.

The actuators in the MZ-VCS include the compressor 710, the outdoor heat exchanger fan 716, the indoor heat exchanger fans 721, 731, and the expansion valves 726, 736. In some vapor compression systems, the compressor 710 speed can be fixed to one or more predetermined settings or varied continuously. Similarly, the outdoor heat exchanger fan 716 can operate at fixed speeds or varied continuously. In some configurations, the indoor heat exchanger fans 721, 731 can be determined by the MZ-VCS controller, or its speed can be determined by occupants when the occupants wish to directly control indoor airflow. The expansion valves are controlled, e.g., electronically-controlled, by the controller 200, to continuously vary from being in fully closed to fully open positions including all possible intermediate positions. Some MZ-VCS implementations substitute electronically-controlled expansion valves with a series combination of a solenoid valve for on/off control, and a separate variable opening valve for precise flowrate control.

The high and low refrigerant pressures are determined by thermodynamic conditions such as outdoor and indoor air temperature, the compressor speed and a joint combination of valve openings. Each of the expansion valves 726 and 736 can be set to different openings, but the overall high and low pressures are determined by a total pressure drop across these valves. Due to the previously mentioned isothermal characteristic of phase change, all indoor heat exchangers are constrained to evaporate at the same temperature.

According to an embodiment, the heating or cooling capacity of the indoor heat exchangers 720 and 730 can be modulated by duty cycling each heat exchanger between "ON" and "OFF" modes of the operation. The heat exchangers 720 and 730 are OFF when an inlet valve that controls refrigerant flow is closed or alternatively, the compressor 710 that pumps the refrigerant through the system is stopped so that no cooling or heating is performed by the heat exchangers 720 and 730. The heat exchangers 720 and 730 are ON when an inlet valve is opened and the compressor 710 is operating so that the heat exchangers 720 and 730 in the zones 725 and 735 operate at their full thermal capacity. A controller decides how to alternate between the modes based on a difference between an indoor zone temperature and a desired indoor zone temperature.

However, the act of switching heat exchangers ON and OFF, especially in the MZ-VCS where the zone heat exchangers can be switched ON and OFF independently from each other, resulting in persistent variations in the outputs of the system, such as zone temperatures and heat exchanger temperatures, that are known to be energetically inefficient and reduce occupant comfort. Accordingly, there is a need for a control system and method to smoothly control the thermal capacity of heat exchangers, such as the heat exchangers of MZ-VCS.

Some embodiments are based on the recognition that the probabilistic surrogate model 102 can be advantageously used to reduce the complexity of controlling the MZ-VCS. Specifically, in the MZ-VCS with a large number of set-points, brute-force sampling of the set-points can result in exorbitant computational expenditure and long tuning times. The sample-efficiency is greatly curtailed by using the LSR-BO that can balance exploration and exploitation via the probabilistic surrogate model 102. According to some embodiments, a scalable, probabilistic machine learning algorithm is required for the MZ-VCS with a large number of set-points. In some embodiments, the scalable probabilistic machine learning algorithm may be based on a Bayesian deep neural network or a variational autoencoder.

Figure 8:
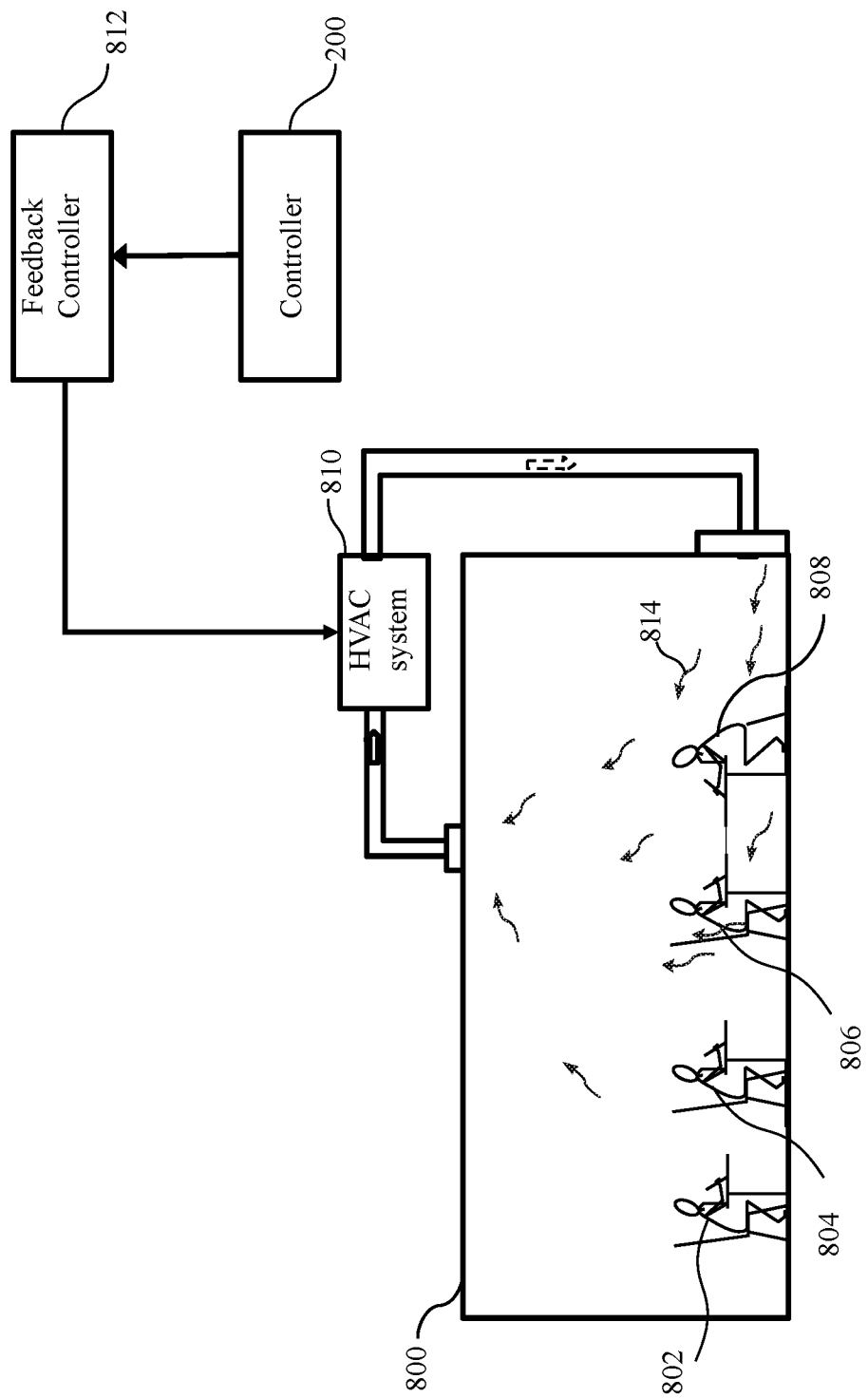
FIG. 8 illustrates controlling of heating, ventilating, and air-conditioning (HVAC system) using the controller, according to some embodiments of the present disclosure.

FIG. 8 illustrates controlling of heating, ventilating, and air-conditioning (HVAC system) 810 using the controller 200, according to some embodiments. An "HVAC" system refers to any heating, ventilating, and air-conditioning (HVAC) system implementing the vapor compression cycle. The HVAC systems 810 span a very broad set of systems, ranging from systems that supply only outdoor air to occupants of a building, to systems which only control the temperature of a building, or to systems that control the temperature and humidity.

The HVAC system 810 is arranged to condition room 800. Room 802 is occupied by occupants 802, 804, 806, and 808. Arrows 814 represent air supplied by the HVAC system 810 to condition room 800. Based on the LSR-BO, the controller 200 determines an optimum combination of setpoints minimizing power consumption of the HVAC system 810.

Further, the optimum combination of setpoints is input to a feedback controller 812 associated with the HVAC system 810. The feedback controller 812 produces control commands based on the optimum combination of setpoints. The feedback controller 812 further controls the HVAC system 810 according to the control commands to minimize the power consumption of the HVAC system 810.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an operation of a vapor compression system (VCS), comprising: at least one processor; and memory having instructions stored thereon that, when executed by the at least one processor, cause the controller to:
 collect data points indicative of control of the operation of
  the VCS with different combinations of setpoints for different actuators of the VCS and corresponding costs of operation of the VCS for each of the different combinations of setpoints;

compute, using a Local Search Region Bayesian optimization (LSR-BO) of the combinations of setpoints and their corresponding costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping;

select from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model;

submit the current combination of setpoints to a feedback controller to control the actuators of the VCS at a current control step according to their corresponding setpoints in the current combination of setpoints to collect a current cost of operation; and update the collected data points with the current combination of setpoints and the corresponding current cost of operation.

2. The controller of claim 1, wherein the data points indicative of control of the operation of the VCS with different combinations of setpoints for different actuators of the VCS and corresponding costs of operation of the VCS for each of the different combinations of setpoints, are determined offline.

3. The controller of claim 1, wherein the LSR constraint is a norm-ball centered on the current combination of setpoints.

4. The controller of claim 1, wherein the acquisition function is a switch function including a local optimality objective, a global optimality objective, and a criterion of switching between the local optimality objective and the global optimality objective, and wherein the criterion is a user-defined threshold.

5. The controller of claim 4, wherein the processor is further configured to select, based on the local optimality objective, a local combination of setpoints within a local search space region around the current combination of setpoints defined by the LSR constraint, as the current combination of setpoints if a value of the acquisition function is greater than the user-defined threshold.

6. The controller of claim 4, wherein the processor is further configured to select, based on the global optimality objective, a global combination of setpoints from a global search space in a direction towards the global minimum of the probabilistic surrogate model, as the current combination of setpoints if the value of the acquisition function is lesser than the threshold, and wherein the global combination of setpoints is projected onto the local search space region around the current combination of setpoints.

7. The controller of claim 1, wherein the acquisition function is determined based on an approximate dynamic programming that is based on a multistep lookahead.

8. The controller of claim 7, wherein the multistep lookahead is based on at least one or a combination of a base policy, a rollout policy, and a policy search method.

9. The controller of claim 1, wherein the LSR-BO determines the probabilistic surrogate model using one or a combination of a Gaussian process regression, a neural process regression, and a Bayesian neural network.

10. The controller of claim 1, wherein the processor is further configured to update, using the LSR-BO, the probabilistic surrogate model based on the current combination of setpoints and the corresponding current cost of operation.

11. The controller of claim 1, wherein the VCS is a multi-zone vapor compression system (MZ-VCS) including at least a single compressor connected to multiple heat exchangers arranged in one or more indoor zones.

12. The controller of claim 1, wherein the cost of operation corresponding to the combination of setpoints is power consumption of the VCS operated according to the combination of setpoints.

13. The controller of claim 1, wherein the feedback controller is one or a combination of a Proportional Integral (PI) controller, a proportional-integral-derivative (PID) controller, a Model Predictive Control (MPC) controller, or a robust controller.

14. A method for controlling an operation of a vapor compression system (VCS), the method comprising:

collecting data points indicative of control of the operation of the VCS with different combinations of setpoints for different actuators of the VCS and corresponding costs of operation of the VCS for each of the different combinations of setpoints;

computing, using a Local Search Region Bayesian optimization (LSR-BO) of the combinations of setpoints and their corresponding costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping;

selecting from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model;

submitting the current combination of setpoints to a feedback controller to control the actuators of the VCS at a current control step according to their corresponding setpoints in the current combination of setpoints to collect a current cost of operation; and updating the collected data points with the current combination of setpoints and the corresponding current cost of operation.

15. The method of claim 14, wherein the data points indicative of control of the operation of the VCS with different combinations of setpoints for different actuators of the VCS and corresponding costs of operation of the VCS for each of the different combinations of setpoints, are determined offline.

16. The method of claim 14, wherein the LSR constraint is a norm-ball centered on the current combination of setpoints.

17. The method of claim 14, wherein the acquisition function is a switch function including a local optimality objective, a global optimality objective, and a criterion of switching between the local optimality objective and the global optimality objective, and wherein the criterion is a user-defined threshold.

18. The method of claim 14, wherein the method further comprises updating, using the LSR-BO, the probabilistic surrogate model based on the current combination of setpoints and the corresponding current cost of operation.

19. The method of claim 14, wherein the cost of operation corresponding to the combination of setpoints is power consumption of the VCS operated according to the combination of setpoints.

20. A non-transitory computer readable storage medium embodied thereon a program executable by a processor for performing a method for controlling an operation of a vapor compression system (VCS), the method comprising:
- collecting data points indicative of control of the operation of the VCS with different combinations of setpoints for different actuators of the VCS and corresponding costs of operation of the VCS for each of the different combinations of setpoints;
    - computing, using a Local Search Region Bayesian optimization (LSR-BO) of the combinations of setpoints and their corresponding costs of operation, a probabilistic surrogate model providing a probabilistic mapping between various combinations of setpoints for different actuators of the VCS and their corresponding costs of operation, wherein the probabilistic surrogate model defines at least first two order moments of the cost of operation in the probabilistic mapping;
- selecting from the probabilistic surrogate model a current combination of setpoints improving the cost of operation with respect to a previous combination of setpoints used to control the actuators of the VCS at a previous control step, according to an acquisition function of the first two order moments of the cost of operation subject to a LRS constraint restricting a distance between the current combination of setpoints and the previous combination of setpoints while allowing an incremental search for a global minimum at the probabilistic surrogate model;
- submit the current combination of setpoints to a feedback controller to control the actuators of the VCS at a current control step according to their corresponding setpoints in the current combination of setpoints to collect a current cost of operation; and
- updating the collected data points with the current combination of setpoints and the corresponding current cost of operation.

\* \* \* \* \*